United States Patent
Yoshihara et al.

(10) Patent No.: US 9,327,755 B2
(45) Date of Patent: May 3, 2016

(54) STEERING DEVICE

(71) Applicants: JTEKT CORPORATION, Osaka-shi, Osaka (JP); TOYOTA JIDOSHA KABUSHIKI KAISHA, Toyota-shi, Aichi-ken (JP); FUJI KIKO CO., LTD., Kosai-shi, Shizuoka (JP)

(72) Inventors: Yoshihito Yoshihara, Kashihara (JP); Tomonori Sugiura, Yamatokoriyama (JP); Yuji Takahashi, Obu (JP); Atsumune Nagatani, Kashihara (JP); Tatsuro Kubota, Shiki-gun (JP); Shigeru Hoshino, Toyota (JP); Yota Uesaka, Toyohashi (JP)

(73) Assignees: JTEKT CORPORATION, Osaka-shi (JP); TOYOTA JIDOSHA KABUSHIKI KAISHA, Toyota (JP); FUJI KIKO CO., LTD., Kosai-shi (JP)

( * ) Notice: Subject to any disclaimer, the term of this patent is extended or adjusted under 35 U.S.C. 154(b) by 0 days.

(21) Appl. No.: 14/665,710

(22) Filed: Mar. 23, 2015

(65) Prior Publication Data

US 2015/0266497 A1   Sep. 24, 2015

(30) Foreign Application Priority Data

Mar. 24, 2014   (JP) .................................. 2014-060934

(51) Int. Cl.
*B62D 1/184*   (2006.01)
*B62D 1/189*   (2006.01)
*B62D 1/19*    (2006.01)

(52) U.S. Cl.
CPC ................ *B62D 1/184* (2013.01); *B62D 1/189* (2013.01); *B62D 1/19* (2013.01); *B62D 1/192* (2013.01); *B62D 1/195* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,244,237 A * | 1/1981 | Sprunger | ............... | B62D 1/184 403/96 |
| 5,580,091 A * | 12/1996 | Doty | ..................... | B60R 22/341 188/371 |
| 5,787,759 A * | 8/1998 | Olgren | ................... | B62D 1/184 280/777 |
| 7,213,484 B2 * | 5/2007 | Sawada | .................. | B62D 1/184 280/775 |

(Continued)

FOREIGN PATENT DOCUMENTS

| | | |
|---|---|---|
| EP | 2423073 A1 | 2/2012 |
| EP | 2259957 B1 | 10/2012 |

(Continued)

OTHER PUBLICATIONS

Aug. 25, 2015 Search Report issued in European Patent Application No. 15160367.7.

*Primary Examiner* — Nicole Verley
(74) *Attorney, Agent, or Firm* — Oliff PLC

(57) ABSTRACT

A steering device includes: a steering shaft and a column jacket that are telescopically adjustable in an axial direction; a lock member that advances to an advance position at which the lock member is engaged with one of holes of a lock plate and that retreats to a retreat position at which the lock member is disengaged from the hole of the lock plate; an operation member that is mechanically separated from the lock member; a biasing member that constantly biases the lock member toward the advance position; and a transmission member that moves the lock member to the retreat position against a biasing force of the biasing member in accordance with operation of the operation member.

10 Claims, 11 Drawing Sheets

(56) References Cited

U.S. PATENT DOCUMENTS

| | | | | |
|---|---|---|---|---|
| 7,587,959 B2 * | 9/2009 | Ridgway | ................ | B62D 1/184 280/775 |
| 7,954,852 B2 * | 6/2011 | Ueno | ....................... | B62D 1/16 280/775 |
| 8,042,426 B2 * | 10/2011 | Jo | ......................... | B62D 1/184 280/775 |
| 8,438,944 B2 * | 5/2013 | Ridgway | ................ | B62D 1/184 280/775 |
| 8,539,855 B2 * | 9/2013 | Schnitzer | ............... | B62D 1/184 280/775 |
| 8,622,427 B2 * | 1/2014 | Minamigata | ........... | B62D 1/195 280/777 |
| 8,627,742 B2 * | 1/2014 | Ridgway | ................ | B62D 1/192 280/777 |
| 8,689,659 B2 * | 4/2014 | Schnitzer | ............... | B62D 1/195 280/777 |
| 8,783,717 B2 * | 7/2014 | Tinnin | ................... | B62D 1/184 280/777 |
| 8,827,311 B2 * | 9/2014 | Schnitzer | ............... | B62D 1/184 188/371 |
| 8,894,097 B2 * | 11/2014 | Sulser | ................... | B62D 1/184 280/777 |
| 2003/0006602 A1 * | 1/2003 | Waid | ...................... | B62D 1/195 280/777 |
| 2007/0235998 A1 * | 10/2007 | Demmon | ............... | B62D 1/187 280/775 |
| 2007/0266814 A1 * | 11/2007 | Park | ...................... | B62D 1/184 74/493 |
| 2010/0282016 A1 | 11/2010 | Oehri et al. | | |
| 2010/0300236 A1 * | 12/2010 | Goulay | .................. | B62D 1/195 74/493 |
| 2010/0300238 A1 * | 12/2010 | Ridgway | ............... | B62D 1/184 74/493 |
| 2012/0266716 A1 * | 10/2012 | Sulser | ................... | B62D 1/184 74/493 |
| 2013/0074641 A1 | 3/2013 | Schnitzer et al. | | |
| 2014/0352479 A1 * | 12/2014 | Hiesse | .................. | B62D 1/184 74/492 |
| 2015/0076804 A1 * | 3/2015 | Hansen | ................. | B62D 1/184 280/775 |

FOREIGN PATENT DOCUMENTS

| | | |
|---|---|---|
| EP | 2576319 B1 | 2/2015 |
| JP | 2011516323 A | 5/2011 |

* cited by examiner

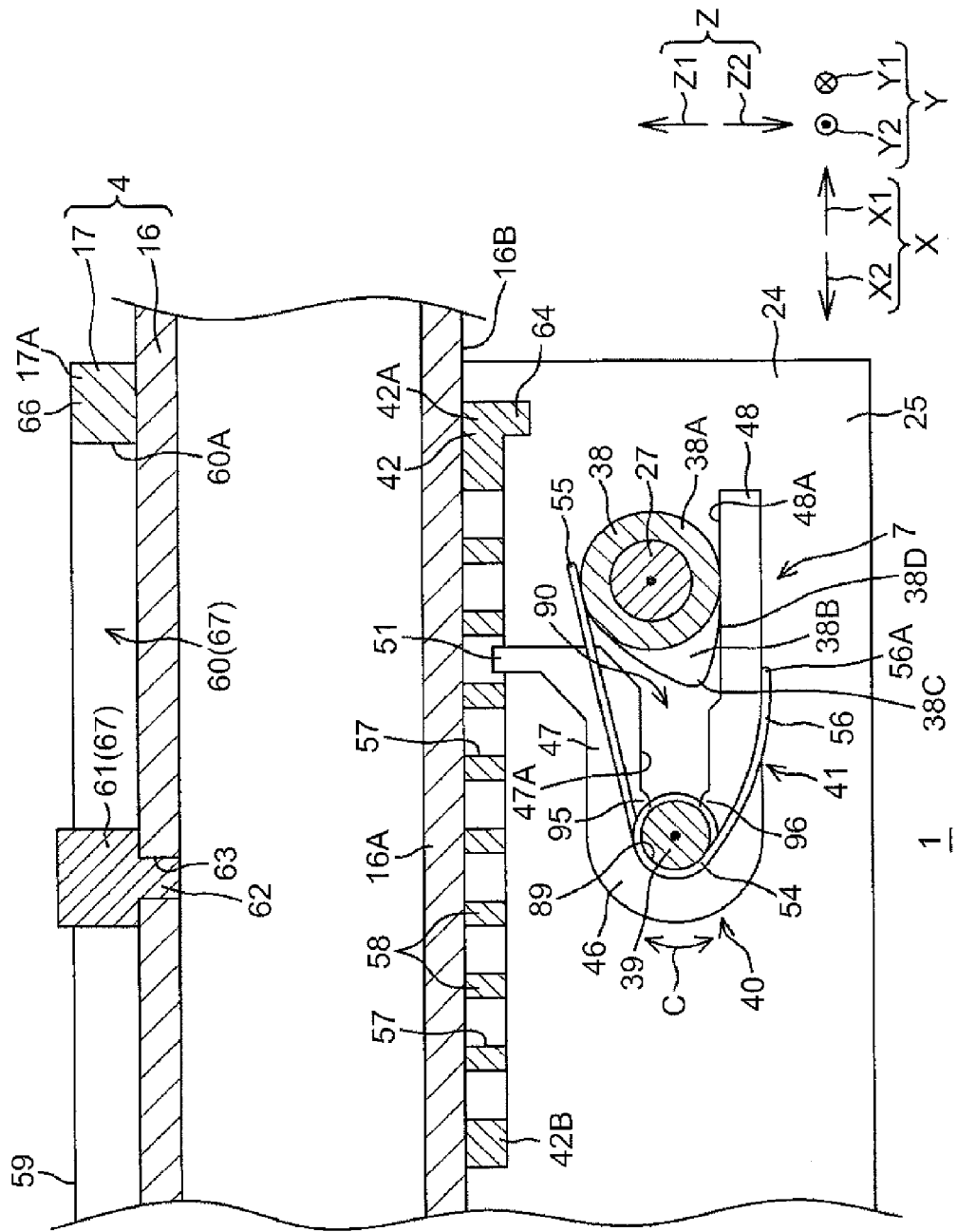

STEERING DEVICE

INCORPORATION BY REFERENCE

The disclosure of Japanese Patent Application No. 2014-060934 filed on Mar. 24, 2014 including the specification, drawings and abstract is incorporated herein by reference in its entirety.

BACKGROUND OF THE INVENTION

1. Field of the Invention

The invention relates to a steering device.

2. Description of Related Art

For example, in a steering column for an automobile described in Published Japanese Translation of PCT application No. 2011-516323 (JP 2011-516323 A), a steering shaft to which a steering wheel is mounted is rotatably supported by an adjustment unit supported by a support unit. When the adjustment unit is moved in an axial direction of the steering shaft, it is possible to adjust the position of the steering wheel in the axial direction.

The adjustment unit is disposed between a pair of side plates in the support unit. Each side plate is provided with a hole, and a clamping bolt is inserted into the hole. A lock member is attached to the clamping bolt, and an operation lever is coupled to the clamping bolt. To the adjustment unit, an opposite lock member formed with a large number of notches is coupled.

When the operation lever is operated and the clamping bolt is thereby rotated, a protrusion of the lock member is inserted into any of the notches of the opposite lock member, and the position of the steering wheel in the axial direction is locked.

In the steering column described in JP 2011-516323 A, the operation lever and the lock member having the protrusion inserted into the notch of the opposite lock member are mechanically coupled to each other via the clamping bolt. As a result, when the operation lever and the lock member are assembled to the clamping bolt, it is necessary to adjust relative positions (rotation phases) of the lock member and the operation lever in a rotation direction of the clamping bolt such that the insertion of the protrusion of the lock member into the notch of the opposite lock member for locking the position of the steering wheel does not become incomplete, and hence there is a possibility that assembly of the steering device becomes difficult.

SUMMARY OF THE INVENTION

The invention provides the steering device capable of reducing difficulty in assembly.

An aspect of the invention is a steering device including: a steering shaft including a first end to which a steering member is mounted and a second end, wherein the steering shaft is telescopically adjustable in an axial direction of the steering shaft; a column jacket rotatably supporting the steering shaft and including an upper jacket positioned on a first end side and a lower jacket positioned on a second end side, wherein the column jacket is telescopically adjustable together with the steering shaft with movement of the upper jacket relative to the lower jacket in the axial direction; a lock plate fixed to the upper jacket and provided with a plurality of holes arranged in the axial direction; a support bracket fixed to a vehicle body and supporting the column jacket; a lock member that advances to and retreats from the lock plate between an advance position at which the lock member is engaged with one of the holes of the lock plate and a retreat position at which the lock member is disengaged from the hole of the lock plate; an operation member supported by the support bracket in a state in which the operation member is mechanically separated from the lock member, wherein the operation member is operated when the steering shaft and the column jacket are telescopically adjusted; a biasing member that constantly biases the lock member toward the advance position irrespective of operation of the operation member; and a transmission member that moves the lock member to the retreat position against a biasing force of the biasing member in accordance with the operation of the operation member.

According to the above configuration, in the steering device, the column jacket includes the upper jacket positioned on the first end side of the steering member and the lower jacket positioned on the second end side. With the movement of the upper jacket relative to the lower jacket, the column jacket is telescopically adjusted (extended or contracted) together with the steering shaft.

The lock member advances to and retreats from the lock plate fixed to the upper jacket. The lock member advances to the advance position at which the lock member is engaged with one of the holes of the lock plate and retreats to the retreat position at which the lock member is disengaged from the hole of the lock plate. In the case where the lock member is at the advance position, the extension and contraction of the steering shaft and the column jacket are stopped, and hence the position of the steering member in the axial direction of the steering shaft is locked. In the case where the lock member is at the retreat position, the extension and contraction of the column jacket and the steering shaft are allowed, and hence it is possible to adjust the position of the steering member in the axial direction of the steering shaft.

In the steering device, the operation member is operated when the steering shaft and the column jacket are telescopically adjusted. The lock member is mechanically separated from the operation member, and is constantly biased toward the advance position by the biasing member irrespective of the operation of the operation member. The lock member is linked with the operation of the operation member via the transmission member only when the lock member moves to the retreat position.

Accordingly, when the lock member and the operation member are combined in the assembly of the steering device, it is only necessary to pay attention to the linkage with the operation of the operation member when the lock member moves to the retreat position. As a result, it is possible to omit work for adjusting relative positions of the lock member and the operation member such that the lock member can move to the advance position and the retreat position accurately. Accordingly, it is possible to reduce difficulty in the assembly of the steering device.

The steering device may further include a positioning portion that is provided in the transmission member and positions the lock member.

According to the above configuration, since the positioning portion that positions the lock member is provided in the transmission member, it is possible to easily position the lock member and the transmission member when the steering device is assembled.

The biasing member may bias the lock member and the transmission member such that the lock member and the transmission member approach each other.

According to the above configuration, the biasing member biases the lock member and the transmission member such that the lock member and the transmission member approach each other. Accordingly, it is possible to suppress rattling between the lock member and the transmission member to a low level, and hence the transmission member can move the lock member to the retreat position in accordance with the operation of the operation member without lagging behind the operation.

The lock member may include a breakaway portion, and the breakaway portion is broken in the lock member at the advance position when a load acts on the steering shaft and the column jacket.

The breakaway portion may be a low-strength portion including a notch provided in the lock member.

The steering device further include a support shaft supported by the lower jacket. In this case, the breakaway portion is a pin fixed to the lock member, a groove portion is defined in the lock member, the support shaft is disposed in the groove portion on a front side of the pin, and the pin is broken by the support shaft in the lock member at the advance position when the load acts from a rear side.

The steering device may further include a support shaft supported by the lower jacket. In this case, a groove portion is defined in the lock member, the support shaft is disposed in the groove portion, and a protrusion adjacent to the support shaft is provided in the lock member.

According to the above configurations, the breakaway portion is broken in the lock member at the advance position when the load acts, and the column jacket and the steering shaft thereby contracts. With the contraction and the breakage of the lock member, it is possible to absorb energy at the time of the vehicle collision. In addition, by providing the breakaway portion in the existing lock member, it is not necessary to add a new component having the breakaway portion, and hence it is possible to prevent an increase in the number of components and achieve a reduction in cost.

The steering device may further include a first stopper that is provided at an end portion of the lock plate on the first end side and restricts movement of the upper jacket relative to the lower jacket to the second end side by abutment of the first stopper on the lock member from the first end side when the steering shaft and the column jacket are telescopically adjusted.

According to the above configuration, the first stopper provided in the lock plate can prevent the unnecessary movement of the upper jacket relative to the lower jacket to the second end side opposite by abutment of the first stopper on the lock member from the first end side. In addition, by providing the first stopper in the existing lock plate, it is not necessary to add a new component having the first stopper, and hence it is possible to prevent an increase in the number of components and achieve a reduction in cost.

The steering device may further include a second stopper including an elongated hole that is provided in one of the lower jacket and the upper jacket and includes both end portions closed in the axial direction, and an engagement portion that is fixed to the other of the lower jacket and the upper jacket and is inserted into the elongated hole so as to be movable in the axial direction. In this case, the lower jacket has a tubular shape in which the upper jacket is accomodatable, and the second stopper restricts movement of the upper jacket relative to the lower jacket to the first end side by abutment of the engagement portion on a peripheral edge portion of an end portion of the elongated hole in the axial direction when the steering shaft and the column jacket are telescopically adjusted.

According to the above configuration, the second stopper includes the elongated hole on the side of one of the lower jacket and the upper jacket and the engagement portion (on the side of the other of the lower jacket and the upper jacket) inserted into the elongated hole so as to be movable in the axial direction. When the steering shaft and the column jacket are telescopically adjusted, the second stopper can prevent the unnecessary movement of the upper jacket relative to the lower jacket to the first end side of the steering member by abutment of the engagement portion on the peripheral edge portion of the elongated hole. In addition, in the elongated hole, since the both end portions in the axial direction are closed, the engagement portion in the elongated hole is not disengaged from the elongated hole toward both sides in the axial direction, and hence it is possible to prevent the upper jacket from being detached from the lower jacket unexpectedly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11 is a view in which a third modification of the invention is applied to the steering device 1 shown in FIG. 6.

DETAILED DESCRIPTION OF EMBODIMENTS

Hereinbelow, an embodiment of the invention will be described in detail with reference to the accompanying drawings.

Figure 1:
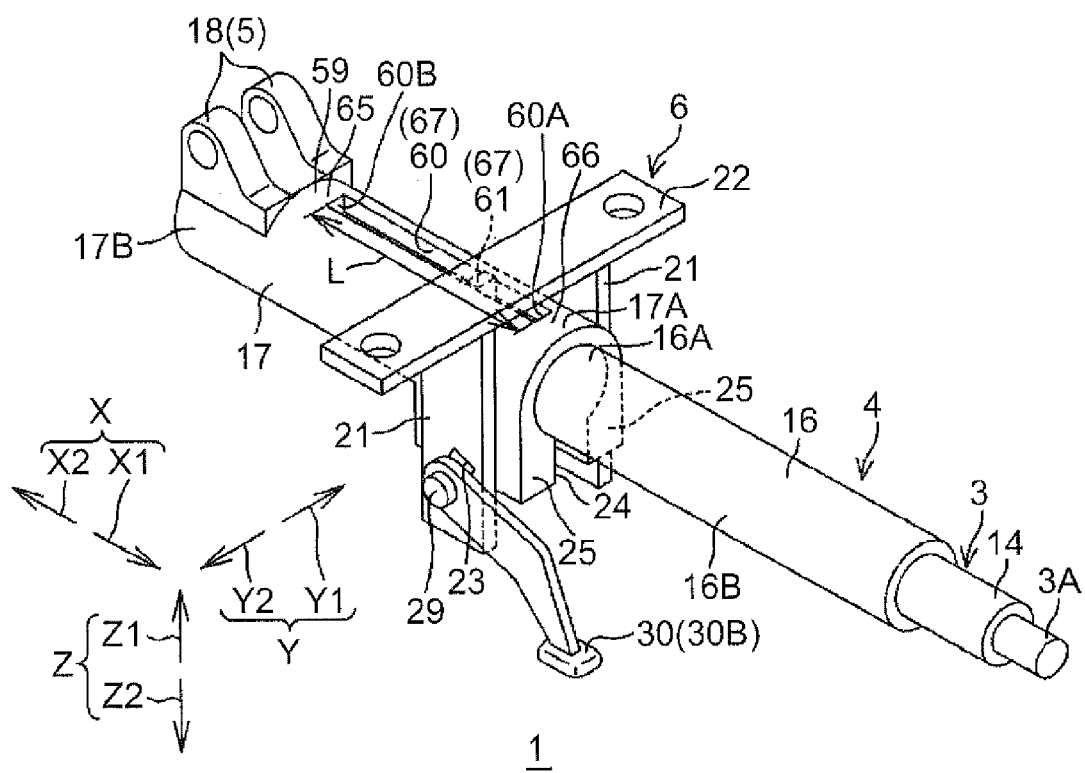
FIG. 1 is a schematic perspective view of a steering device 1 according to an embodiment of the invention.
Figure 2:
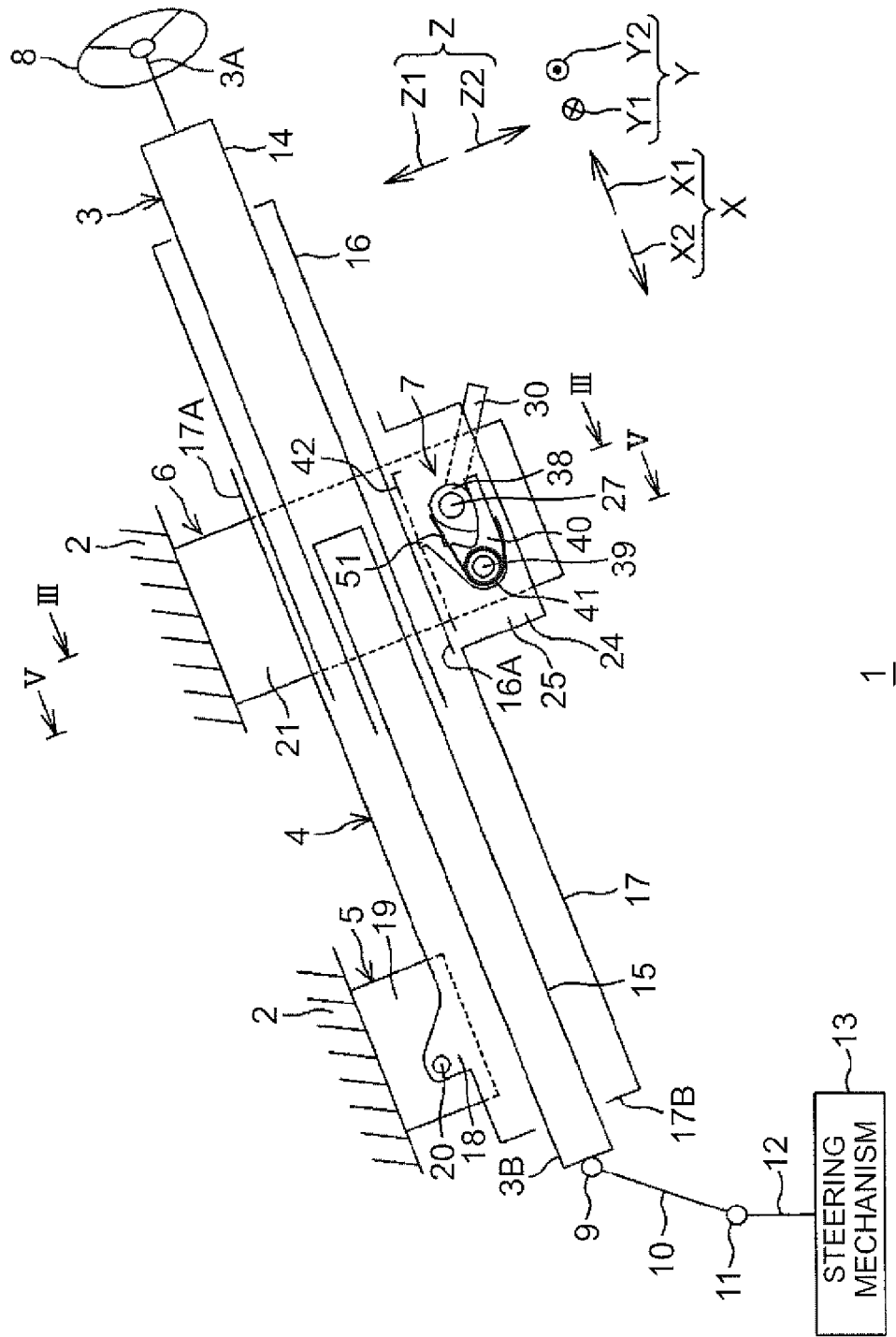
FIG. 2 is a schematic side view showing the schematic configuration of the steering device 1.

FIG. 1 is a schematic perspective view of a steering device 1 according to an embodiment of the invention. FIG. 2 is a schematic side view showing the schematic configuration of the steering device 1.

In FIG. 2, the left side on the paper sheet corresponds to the front side of a vehicle body 2 to which the steering device 1 is mounted, the right side on the paper sheet corresponds to the rear side of the vehicle body 2, the upper side on the paper sheet corresponds to the upper side of the vehicle body 2, and the lower side on the paper sheet corresponds to the lower side of the vehicle body 2.

With reference to FIG. 2, the steering device 1 mainly includes a steering shaft 3, a column jacket 4, a lower bracket 5, an upper bracket 6 as a support bracket, and a lock mechanism 7.

In the steering shaft 3, a steering member 8 is mounted to a first end 3A on the rear side, and a second end 3B on the front side is coupled to a steering mechanism 13 via a universal joint 9, an intermediate shaft 10, a universal joint 11, and a pinion shaft 12. The steering mechanism 13 is constituted by a rack and pinion mechanism and the like. The steering mechanism 13 steers a turning wheel such as a tire that is not shown in response to transmission of rotation of the steering shaft 3.

The steering shaft 3 has a substantially cylindrical or columnar shape that extends in a front-rear direction of the vehicle body 2 as a whole.

In the following description, the direction in which the steering shaft 3 extends is assumed to be an axial direction X. The axial direction X in the embodiment is inclined relative to a horizontal direction such that the second end 3B is lower than the first end 3A. The rear side as the first end side (the side where the steering member 8 is positioned) in the axial direction X is designated by a reference numeral "X1", while the front side as the second end side (the side opposite to the side where the steering member 8 is positioned) in the axial direction X is designated by a reference numeral "X2". The rear side X1 corresponds to the rear side of the vehicle body 2, and the front side X2 corresponds to the front side of the vehicle body 2.

Among directions orthogonal to the axial direction X, a direction perpendicular to the paper sheet in FIG. 2 is referred to as a right-left direction Y, and a direction extending substantially vertically in FIG. 2 is referred to as an up-down direction Z. In the right-left direction Y, the far side on the paper sheet in FIG. 2 is a right side Y1, and the near side on the paper sheet is a left side Y2. The upper side in the up-down direction Z is designated by a reference numeral "Z1", and the lower side in the up-down direction Z is designated by a reference numeral "Z2".

Note that, in each of the drawings other than FIG. 2, directions corresponding to the directions X to Z in FIG. 2 are designated by the same reference numerals as those in FIG. 2.

The steering shaft 3 includes a cylindrical or columnar upper shaft 14 and a cylindrical or columnar lower shaft 15. The upper shaft 14 is disposed on the rear side X1 of the lower shaft 15. The upper shaft 14 and the lower shaft 15 are concentrically arranged.

An end portion of the upper shaft 14 on the rear side X1 corresponds to the first end 3A of the steering shaft 3, and the steering member 8 is coupled to the end portion of the upper shaft 14 on the rear side X1. In the upper shaft 14, at least an end portion on the front side X2 is formed in a cylindrical shape. Into the end portion of the upper shaft 14 on the front side X2, an end portion of the lower shaft 15 on the rear side X1 is inserted from the front side X2.

The upper shaft 14 and the lower shaft 15 are fitted to each other by spline fitting or serration fitting. Accordingly, the upper shaft 14 and the lower shaft 15 can rotate together integrally, and can move relative to each other along the axial direction X. Therefore, the steering shaft 3 is telescopically adjustable (the steering shaft 3 can extend or contract) in the axial direction X.

The column jacket 4 is a hollow body that extends in the axial direction X as a whole. The steering shaft 3 is accommodated in the column jacket 4. The column jacket 4 has a substantially tubular upper jacket 16 and a substantially tubular lower jacket 17 that extend in the axial direction X.

The upper jacket 16 is positioned on the rear side X1 of the lower jacket 17. In other words, the lower jacket 17 is positioned on the front side X2 of the upper jacket 16. The lower jacket 17 is thicker than the upper jacket 16, and is fitted on the upper jacket 16. Specifically, an end portion 16A of the upper jacket 16 on the front side X2 is inserted into an end portion 17A of the lower jacket 17 on the rear side X1 from the rear side X1. In other words, the lower jacket 17 accommodates a part of the upper jacket 16. In this state, the upper jacket 16 can move relative to the lower jacket 17 in the axial direction X. With this relative movement, the column jacket 4 is telescopically adjustable in the axial direction X.

In addition, the steering shaft 3 is coupled to the column jacket 4 via a bearing that is not shown, and hence the column jacket 4 rotatably supports the steering shaft 3.

Specifically, the upper shaft 14 and the upper jacket 16 are coupled to each other via a bearing that is not shown. In addition, the lower shaft 15 and the lower jacket 17 are coupled to each other via a bearing that is not shown. Accordingly, the coupled body of the upper shaft 14 and the upper jacket 16 can move relative to the lower shaft 15 and the lower jacket 17 in the axial direction X. With this, the column jacket 4 is telescopically adjustable together with the steering shaft 3.

The positional adjustment of the steering member 8 in the axial direction X by extension or contraction of the steering shaft 3 and the column jacket 4 is called a telescopic adjustment.

The lower bracket 5 supports the portion of the column jacket 4 on the front side X2, and couples the steering device 1 to the vehicle body 2. Specifically, the lower bracket 5 supports the portion of the lower jacket 17 on the front side X2.

The lower bracket 5 includes a movable bracket 18 fixed to the lower jacket 17, a fixed bracket 19 fixed to the vehicle body 2, and a central shaft 20 extending in the right-left direction Y.

A pair of the right and left movable brackets 18 are provided on, e.g., an upper outer peripheral surface of an end portion 17B of the lower jacket 17 on the front side X2 (see FIG. 1). The movable bracket 18 is tiltably supported by the fixed bracket 19 via the central shaft 20. As a result, the entire column jacket 4 can tilt vertically about the central shaft 20 together with the steering shaft 3. An orientation adjustment of the steering member 8 by the tilt is called a tilt adjustment. The lower jacket 17 is coupled to the fixed bracket 19 fixed to the vehicle body 2 via the central shaft 20, and hence the lower jacket 17 can tilt but cannot move in the axial direction X.

The upper bracket 6 supports the portion of the column jacket 4 on the rear side X1 of the movable bracket 18. Specifically, the upper bracket 6 supports the portion of the lower jacket 17 on the rear side X1.

Figure 3:
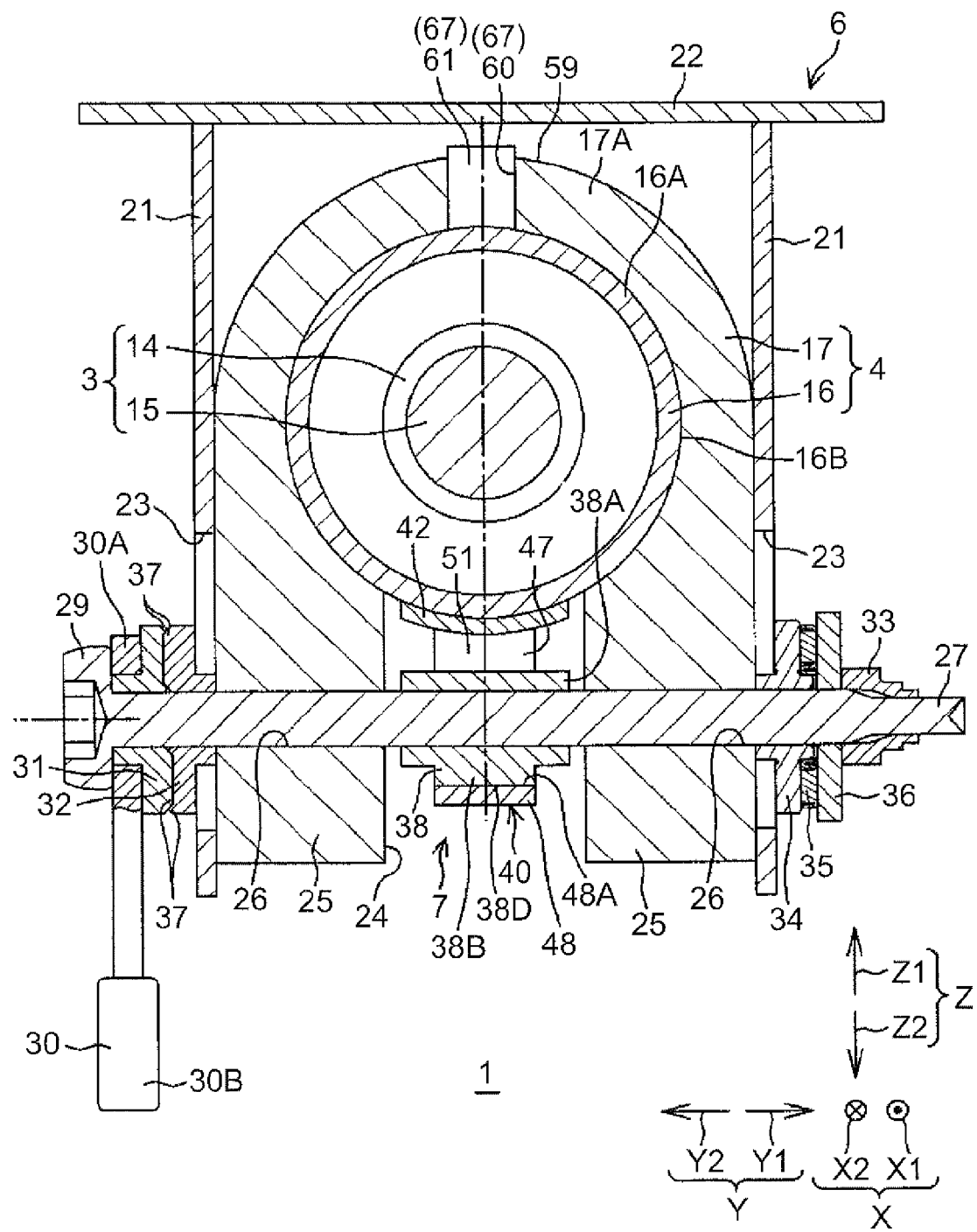
FIG. 3 is a schematic cross-sectional view of the steering device 1 taken along the line III-III of FIG. 2.

FIG. 3 is a schematic cross-sectional view of the steering device 1 taken along the line III-III of FIG. 2.

With reference to FIG. 3, the upper bracket 6 has a groove shape that is opened downward, and is formed to be bilaterally symmetric with respect to the column jacket 4 so as to have a substantially U-shape that is vertically inverted when viewed from the axial direction X. Specifically, the upper bracket 6 integrally includes a pair of side plates 21 that oppose each other with the column jacket 4 interposed therebetween and a coupling plate 22 that is coupled to the upper end portions of the pair of the side plates 21. The side plate 21 is thin in the right-left direction Y, and the coupling plate 22 is thin in the up-down direction Z.

In the pair of the side plates 21, tilt elongated holes 23 are formed at the same positions when viewed from the right-left direction Y. The tilt elongated hole 23 extends in the up-down direction Z or, to be precise, in a tilt direction as a circumferential direction with the central shaft 20 (see FIG. 2) serving as the center. The coupling plate 22 has extending portions that extend outward in the right-left direction Y beyond the pair of the side plates 21, and the entire upper bracket 6 is fixed to the vehicle body 2 using bolts (not shown) or the like that are inserted into the extending portions.

Herein, in a portion on the lower side Z2 in the end portion 17A of the lower jacket 17 on the rear side X1, a slit 24 as a cut-out that extends in the axial direction X is formed (see also FIG. 1). The slit 24 is opened to both of the rear side X1 and the lower side Z2 from the end portion 17A toward the outside of the lower jacket 17 (see also FIG. 1). Accordingly, the end portion 17A of the lower jacket 17 has a vertically inverted substantially U-shaped cross section.

In addition, at the end portion 17A of the lower jacket 17, a pair of support portions 25 that extend to the lower side Z2 while defining the slit 24 in the right and left direction Y is integrally provided. Each support portion 25 has a substantially rectangular solid shape that spreads in the axial direction X and the up-down direction Z.

In the pair of the support portions 25, through holes 26 that pass through the support portions 25 in the right-left direction Y are formed at the same positions when viewed from the right-left direction Y.

The steering device 1 includes a clamping shaft 27 that is inserted into a portion where the through hole 26 and the tilt elongated hole 23 overlap each other when viewed from the right-left direction Y. The clamping shaft 27 has a substantially columnar shape that extends in the right-left direction Y. Both ends of the clamping shaft 27 in the right-left direction Y protrude outward in the right-left direction Y from the pair of the side plates 21 of the upper bracket 6. At the end portion of the clamping shaft 27 on the left side Y2, a head portion 29 having a diameter larger than that of the clamping shaft 27 is formed.

In the steering device 1, between the head portion 29 and the side plate 21 on the left side Y2, a grippable lever-type operation member 30 that is operated for the telescopic adjustment and the tilt adjustment, an annular cam 31, and a cam follower 32 are arranged in this order from the left side Y2.

The clamping shaft 27 is inserted into a base end portion 30A of the operation member 30 on one end side in a longitudinal direction, the cam 31, and the cam follower 32. Since the clamping shaft 27 is inserted into each tilt elongated hole 23 of the upper bracket 6, the operation member 30, the cam 31, and the cam follower 32 are supported by the upper bracket 6 via the clamping shaft 27. Since the upper bracket 6 supports the lower jacket 17, the operation member 30 is supported also by the lower jacket 17.

The operation member 30 and the cam 31 can rotate integrally with each other relative to the clamping shaft 27, while the cam follower 32 can rotate relative to the clamping shaft 27 and can move in the right-left direction Y. However, a portion of the cam follower 32 that is inserted into the tilt elongated hole 23 of the side plate 21 on the left side Y2 is formed with two opposing surfaces, and hence the slipping of the cam follower 32 is prevented by the tilt elongated hole 23.

To the end portion of the clamping shaft 27 on the right side Y1, a nut 33 is attached. Between the nut 33 and the side plate 21 on the right side, an interposed member 34, a needle roller bearing 35, and a thrust washer 36 are arranged in this order from the left side Y2. The clamping shaft 27 is inserted into the interposed member 34, the needle roller bearing 35, and the thrust washer 36.

The clamping shaft 27 can move in the above-described tilt direction in each tilt elongated hole 23 of the upper bracket 6. When a use such as a driver moves the steering member 8 in the up-down direction Z for the tilt adjustment, the entire column jacket 4 tilts relative to the upper bracket 6 as described above. The tilt adjustment of the steering member 8 is performed within a range in which the clamping shaft 27 can move in the tilt elongated hole 23.

When a user grips a tip portion 30B of the operation member 30 on one end side in the longitudinal direction and rotates the operation member 30 about the clamping shaft 27 in a first direction after the user performs the telescopic adjustment or the tilt adjustment, the cam 31 rotates, and cam protrusions 37 formed on the cam 31 and the cam follower 32 get on each other. With this, the cam follower 32 moves to the right side Y1 along the axial direction of the clamping shaft 27, and is pushed against the side plate 21 on the left side Y2. By the pushing, the pair of the side plates 21 are clamped from both sides in the right-left direction Y between the cam follower 32 and the interposed member 34.

With this, the pair of the side plates 21 holds the support portions 25 of the lower jacket 17 between them from both sides in the right-left direction Y, and a frictional force is thereby generated between each side plate 21 and the support portion 25. With the frictional force, the position of the column jacket 4 is locked, and the steering member 8 is locked at the position after the tilt adjustment and is prevented from moving in the tilt direction.

In addition, the pair of the support portions 25 of the lower jacket 17 is held between the side plates 21, and the distance between the pair of the support portions 25 is reduced so that the inner portion of the lower jacket 17 is narrowed, and the lower jacket 17 comes in pressure contact with the upper jacket 16 in the lower jacket 17.

With this, the frictional force is generated between the upper jacket 16 and the lower jacket 17, and the position of the upper jacket 16 is thereby locked, and the steering member 8 is thereby locked at the position after the telescopic adjustment and prevented from moving in the axial direction X.

Thus, the state of the steering device 1 when the position of the steering member 8 is fixed in each of the tilt direction and the axial direction X is called a "locked state".

In the steering device 1 in the locked state, when the operation member 30 is rotated in a second direction opposite to the first direction, the cam 31 rotates relative to the cam follower 32, and the cam follower 32 moves to the left side Y2 along the axial direction of the clamping shaft 27. Then clamping to the pair of the side plates 21 between the cam follower 32 and the interposed member 34 is released. As a result, the frictional force between each side plate 21 and the support portion 25 and the frictional force between the lower jacket 17 and the upper jacket 16 disappear, and hence the steering member 8 becomes capable of moving in the axial direction X and the tilt direction. With this, it becomes possible to perform the telescopic adjustment and the tilt adjustment of the steering member 8 again.

Thus, the state of the steering device 1 when the fixing of the position of the steering member 8 in the tilt direction and the axial direction X is released is called a "lock-released state".

Next, the lock mechanism 7 will be described in detail. The lock mechanism 7 is a mechanism for firmly locking the upper jacket 16 such that the upper jacket 16 does not move in the axial direction X in the steering device 1 in the locked state, and is provided in the vicinity of the central portion of the clamping shaft 27 in the right-left direction Y.

Figure 4:
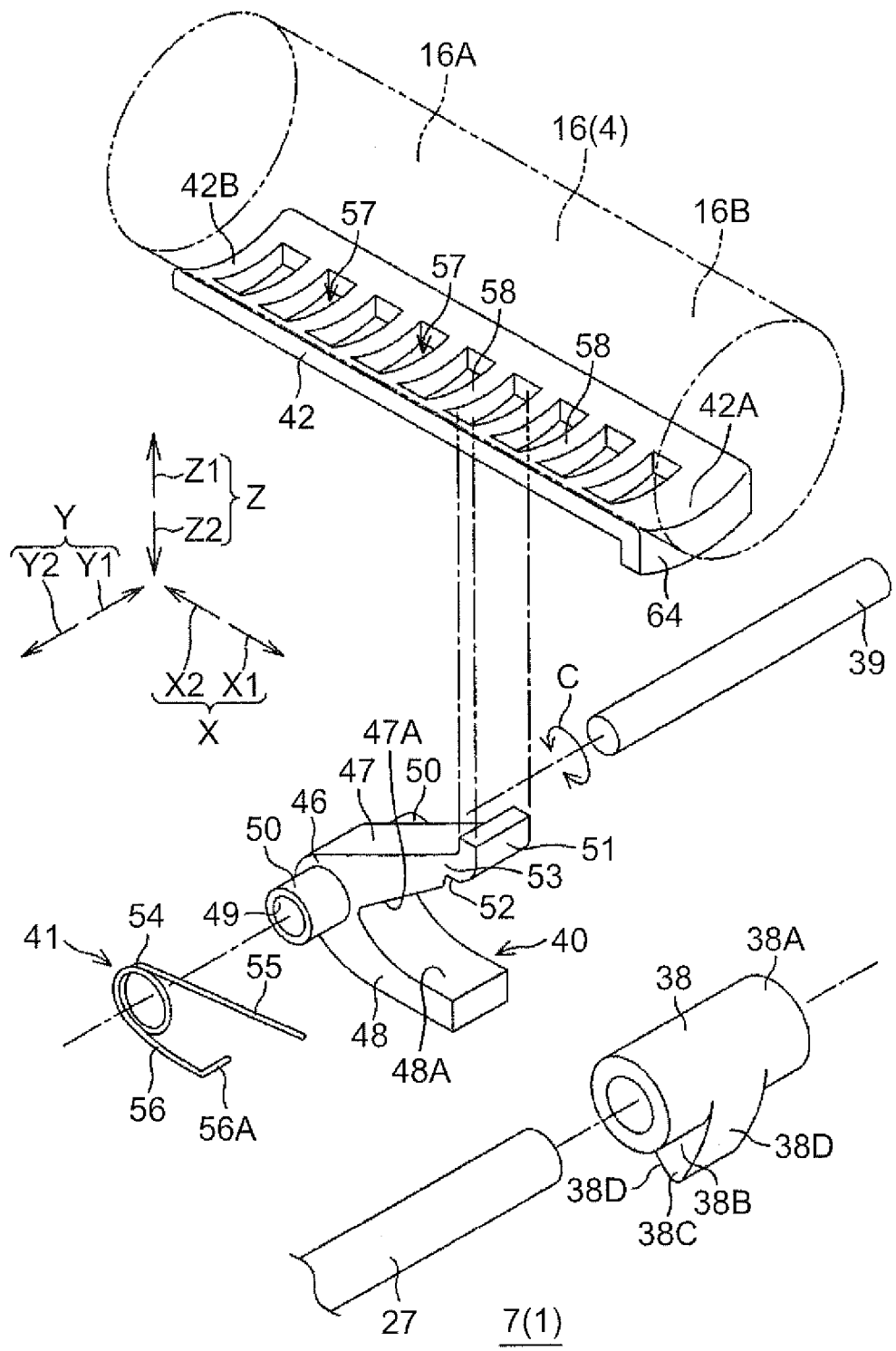
FIG. 4 is an exploded perspective view of the principal portion of the steering device 1.
Figure 5:
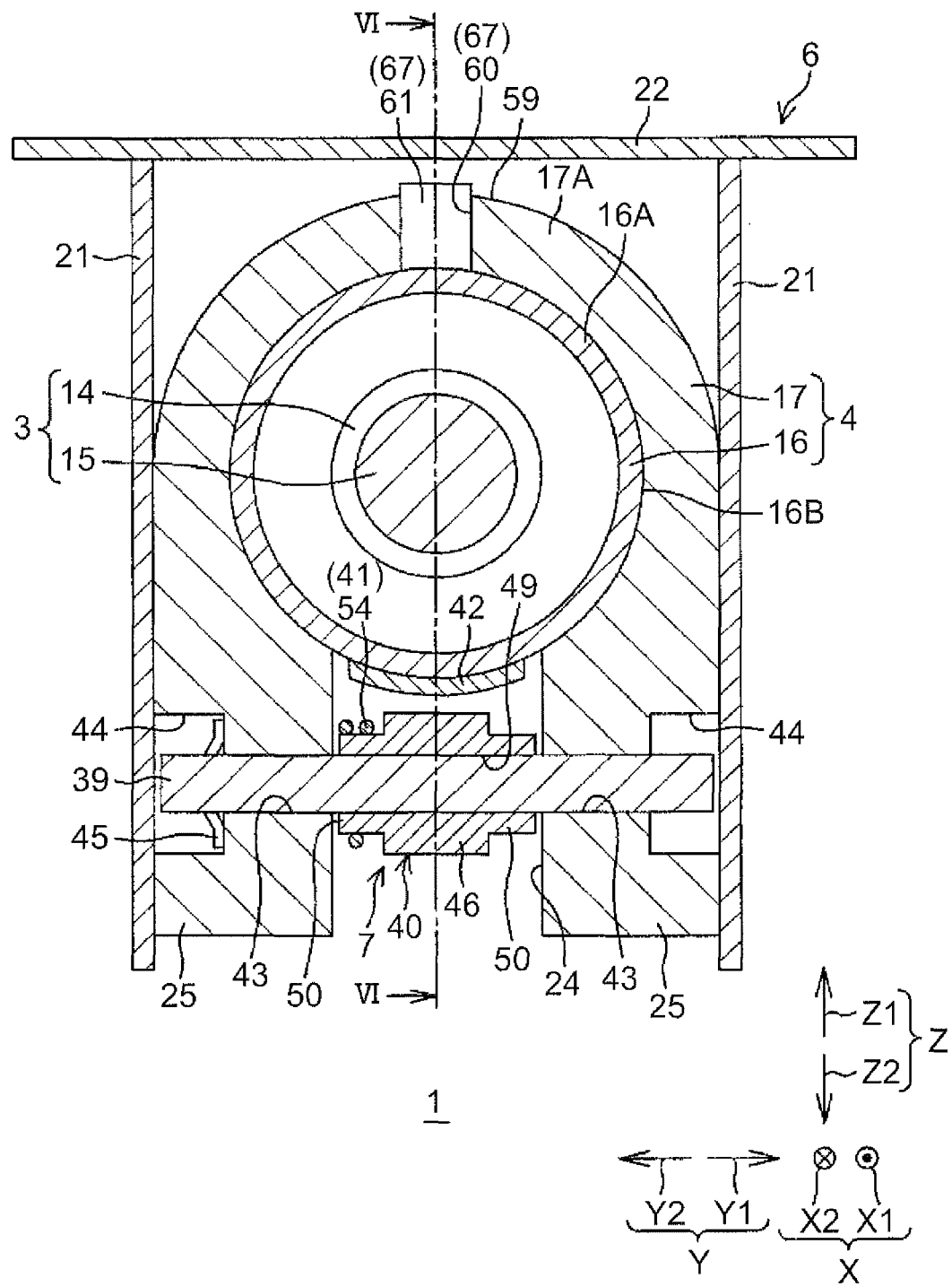
FIG. 5 is a schematic cross-sectional view of the steering device 1 taken along the line V-V of FIG. 2.
Figure 6:
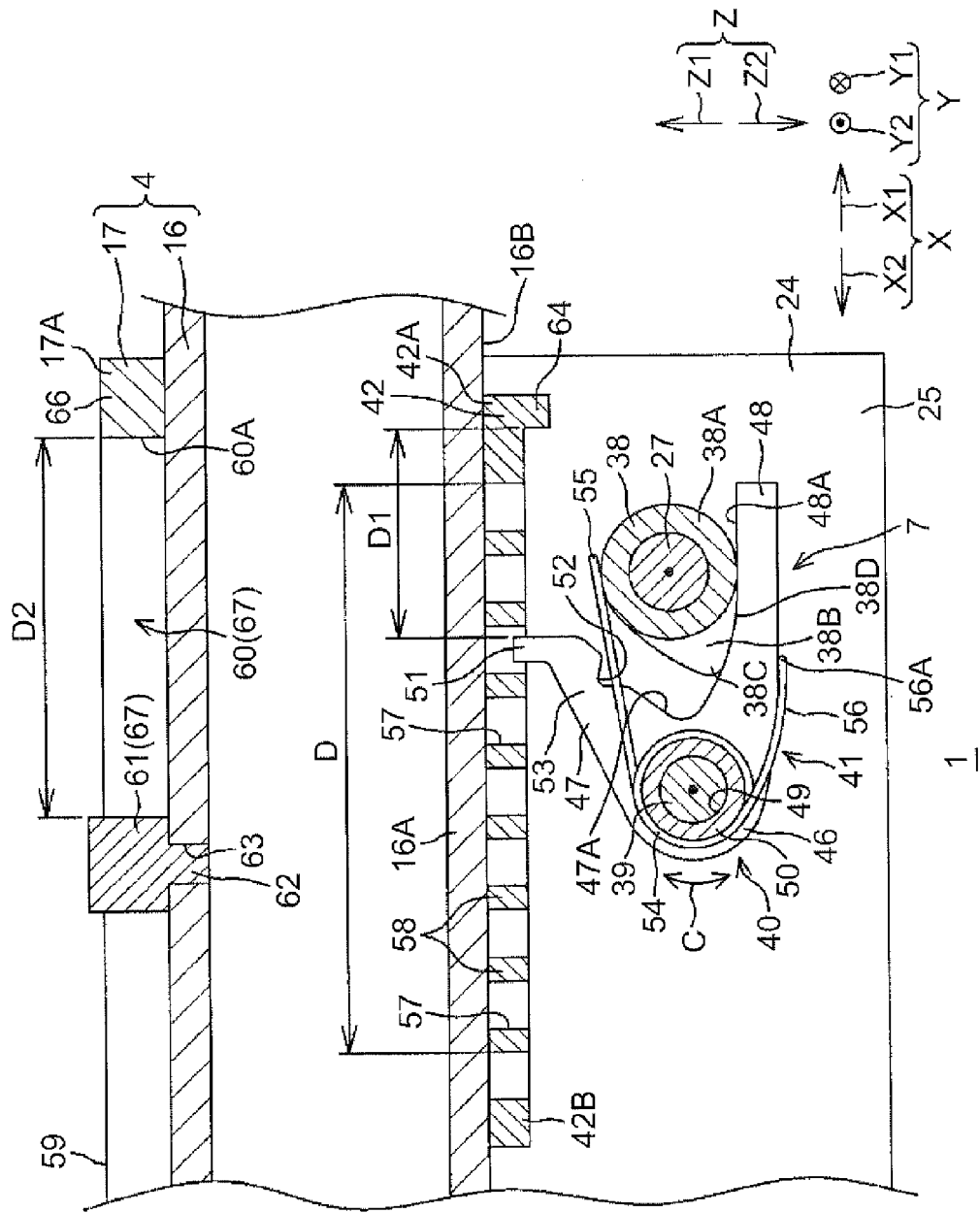
FIG. 6 is a schematic sectional view of the steering device 1 taken long the line VI-VI of FIG. 5.

FIG. 4 is an exploded perspective view of the principal portion of the steering device 1. In FIG. 4, for the convenience of description, the upper jacket 16 is represented by using a two-dot chain line. FIG. 5 is a schematic cross-sectional view of the steering device 1 taken along the line V-V of FIG. 2. FIG. 6 is a schematic sectional view of the steering device 1 taken long the line VI-VI of FIG. 5. In FIG. 6, for the convenience of description, the depiction of the steering shaft 3 is omitted (the same applies to FIGS. 7 to 11 described later).

With reference to FIG. 4, the lock mechanism 7 includes a cam 38 as a transmission member, a support shaft 39, a lock member 40, a biasing member 41, and a lock plate 42.

The cam 38 integrally includes a cylindrical boss portion 38A that extends in the right-left direction Y, and a cam portion 38B that protrudes outward in the radial direction of the boss portion 38A from one position on the periphery of the boss portion 38A. The cam portion 38B has a substantially triangular shape that is tapered with approach to the outside in the radial direction of the boss portion 38A when viewed from the right-left direction Y.

The outer tip portion of the cam portion 38B in the radial direction is designated by a reference numeral "38C". The cam portion 38B has a pair of arc-shaped surfaces 38D that connect the tip portion 38C and the outer peripheral surface of the boss portion 38A and are smoothly coupled to each other on the outer peripheral surface of the boss portion 38A.

The cam 38 is disposed in the slit 24 of the lower jacket 17, and the portion of the clamping shaft 27 exposed in the slit 24 between the pair of the support portions 25 is inserted into the boss portion 38A (see also FIG. 3). The boss portion 38A and the clamping shaft 27 are fitted to each other by spline fitting or the like. Accordingly, the cam 38 can rotate integrally with the clamping shaft 27 in accordance with the operation of the operation member 30.

The support shaft 39 is a substantially columnar shaft that extends in the right-left direction Y. With regard to the support shaft 39, with reference to FIG. 5, one through hole 43 that passes through the support portion 25 in the right-left direction Y is formed at the position on the front side X2 of the through hole 26 in each support portion 25 of the lower jacket 17. In each support portion 25, the through hole 43 has an increased diameter portion 44 of which the diameter is increased on the outside in the right-left direction Y. The support shaft 39 is inserted into the through hole 43 of each support portion 25, and can rotate in a circumferential direction C of the support shaft 39 (see FIG. 4).

Both end portions of the support shaft 39 in the right-left direction Y reach the increased diameter portions 44. A push nut 45 is attached to one of the end portions of the support shaft 39 in the right-left direction Y. In the embodiment, the push nut 45 is attached to the end portion of the support shaft 39 on the left side Y2. The support shaft 39 is positioned in the right-left direction Y relative to the lower jacket 17 by the push nut 45. Thus, the support shaft 39 is supported by the lower jacket 17 by being inserted into the through holes 43.

Returning to FIG. 4, the lock member 40 has a substantially V-shape that is inclined by about 90° to the rear side X1 when viewed from the right-left direction Y. The lock member 40 includes a base end portion 46, and a lock portion 47 and a contact portion 48 that extend from the base end portion 46 to the rear side X1.

The base end portion 46 is a coupling portion of the lock portion 47 and the contact portion 48. The base end portion 46 is formed with an insertion hole 49 that passes through the base end portion 46 in the right-left direction Y. On each of both side surfaces of the base end portion 46 in the right-left direction Y, a cylindrical portion 50 that protrudes outward in the right-left direction Y while surrounding the insertion hole 49 is formed. The cylindrical portion 50 is considered to be a part of the base end portion 46.

The lock portion 47 has a shape that extends from the base end portion 46 to the rear side X1 and the upper side Z1. The end portion of the lock portion 47 on the rear side X1 serves as a tooth 51, and the tooth 51 is bent toward the upper side Z1. In addition, a notch 52 that extends in the right-left direction Y is formed in a lower surface 47A of the lock portion 47. The notch 52 is adjacent to the front side X2 of the tooth 51.

The notch 52 is a groove that extends in the right-left direction Y. The portion of the lock portion 47 in which the notch 52 is formed is called a low-strength portion 53. The thickness of the lock portion 47 is locally reduced in the low-strength portion 53, and hence the strength in the low-strength portion 53 is lowered locally. The low-strength portion 53 functions as a breakaway portion.

The contact portion 48 has a shape that extends from the base end portion 46 to the rear side X1. The contact portion 48 is positioned on the lower side Z2 of the lock portion 47.

The above-described lock member 40 is disposed on the front side X2 of the cam 38 in the slit 24 of the lower jacket 17 (see also FIG. 6). The portion of the support shaft 39 described above positioned in the slit 24 is inserted into the insertion hole 49 of the base end portion 46 of the lock member 40. The support shaft 39 and the base end portion 46 are fitted to each other by spline fitting or the like. Accordingly, the lock member 40 can rotate in the circumferential direction C about the shaft of the support shaft 39 together with the support shaft 39.

Since the support shaft 39 is inserted into the through hole 43 of each support portion 25 of the lower jacket 17 (see FIG. 5), the lock member 40 is supported by the lower jacket 17 via the support shaft 39. In addition, as described above, the operation member 30 is supported by the lower jacket 17 via the clamping shaft 27. That is, the operation member 30 is supported by the lower jacket 17 in a state in which the operation member 30 is mechanically separated from the lock member 40.

In addition, the above-described cam 38 is disposed between the lock portion 47 and the contact portion 48 of the lock member 40, and the cam portion 38B of the cam 38 comes in contact with an upper surface 48A of the contact portion 48 from the upper side Z1 (see FIG. 6).

The biasing member 41 is a spring formed by bending a wire or the like. The biasing member 41 integrally includes a coil-shaped portion 54 that is wound around the outer peripheral surface of the cylindrical portion 50 of the base end portion 46 on the left side Y2 from the outside, and a holding portion 55 and a deformed portion 56 that extend from the coil-shaped portion 54 to the rear side X1. The deformed portion 56 is disposed on the lower side Z2 of the holding portion 55. An end portion 56A of the deformed portion 56 on the rear side X1 is bent to the right side Y1.

In the biasing member 41, the holding portion 55 engages the outer peripheral surface of the portion of the boss portion 38A of the cam 38 on the left side Y2 of the cam portion 38B from the upper side Z1, and the end portion 56A of the deformed portion 56 engages the contact portion 48 of the lock member 40 from the lower side Z2 (see FIG. 6). In the biasing member 41, a force that moves the deformed portion 56 toward the holding portion 55 to the upper side Z1 is constantly generated, and this force serves as a biasing force for biasing the entire lock member 40 to the upper side Z1 along the circumferential direction C.

The lock plate 42 has a plate shape that is long in the axial direction X and is thick in the up-down direction Z, and is curved along an outer peripheral surface 16B of the upper jacket 16. At an end portion 42A of the lock plate 42 on the rear side X1 in the axial direction X, a first stopper 64 is formed. The first stopper 64 is bent to the lower side Z2.

The lock plate 42 is disposed at the portion of the underside of the outer peripheral surface 16B of the upper jacket 16 that is exposed to the slit 24 of the lower jacket 17 (see FIGS. 3 and 5). The lock plate 42 is fixed to the upper jacket 16 by welding or the like. Accordingly, the lock plate 42 can move relative to the lower jacket 17 in the axial direction X together with the upper jacket 16.

The lock plate 42 is positioned on the upper side Z1 of the lock member 40 or, to be precise, immediately above the lock member 40. Accordingly, the tooth 51 of the lock member 40 that is biased to the upper side Z1 by the biasing member 41 is biased toward the lock plate 42.

In the lock plate 42, a plurality of holes 57 that extend along the circumferential direction of the outer peripheral surface 16B of the upper jacket 16 are formed so as to be arranged in the axial direction X. The number of holes 57 is nine in the embodiment, but the number thereof is not limited thereto. Each hole 57 passes through the lock plate 42 in the up-down direction Z as the direction of thickness of the lock plate 42. Partition portions 58 are provided in the lock plate 42 so as to correspond to the plurality of the holes 57 on a one-to-one basis. The partition portion 58 is adjacent to the rear side X1 of the hole 57. Accordingly, the number of provided partition portions 58 is equal to the number of holes 57, and a plurality of the partition portions 58 are arranged in the axial direction X. The partition portion 58 other than the rearmost partition portion 58 closest to the steering member 8 forms a boundary portion between two holes 57 adjacent to each other in the axial direction X.

In the above-described locked state shown in FIG. 6, the cam portion 38B of the cam 38 is directed to the front side X2, and the arc-shaped surface 38D of the cam portion 38B on the lower side Z2 comes in surface contact with the upper surface 48A of the contact portion 48 of the lock member 40 from the upper side Z1.

In the locked state, the tooth 51 of the lock portion 47 in the lock member 40 is normally fitted in and engaged with any of the holes 57 in the lock plate 42 in a state in which the tooth 51 has entered the hole 57 of the lock plate 42 from the lower side Z2. The positions of the lock member 40 and the tooth 51 when the tooth 51 has entered the hole 57 of the lock plate 42 are called "advance positions".

The biasing member 41 constantly biases the entire lock member 40 to the upper side Z1, as described above. With this, the tooth 51 is kept engaged with the hole 57 of the lock plate 42. That is, in the locked state, the tooth 51 is biased so as to be constantly positioned at the advance position. In addition, in the lock member 40 that is biased to the upper side Z1 by the biasing member 41, the contact portion 48 is biased so as to be pressed against the cam portion 38B of the cam 38 from the lower side Z2. Accordingly, the biasing member 41 constantly biases the lock member 40 toward the advance position, and constantly biases the lock member 40 and the cam 38 such that they approach each other.

Accordingly, it is possible to suppress rattling between the lock member 40 and the cam 38 to a low level, and the cam 38 can move the lock member 40 to a retreat position described later in accordance with the operation of the operation member 30 without lagging behind the operation.

In addition, the lock member 40 and the cam 38 are sandwiched between the holding portion 55 and the deformed portion 56 of the biasing member 41, and hence the position of the cam 38 in the up-down direction Z is easily determined, and it is possible to suppress the rattling between the cam 38 and the clamping shaft 27.

In the state in which the tooth 51 is at the advance position and is engaged with any hole 57 in the lock plate 42 in the locked state, the tooth 51 engaged with the hole 57 is sandwiched between the partition portions 58 on both sides in the axial direction X. Accordingly, the movement of the lock plate 42 in the axial direction X is prevented by the lock member 40. In this connection, in the case where the tooth 51 is engaged with the frontmost hole 57, the tooth 51 is sandwiched between the frontmost partition portion 58 and a front end portion 42B of the lock plate 42 that defines the hole 57 from the front side X2.

In addition, as described above, the lock plate 42 is fixed to the upper jacket 16, and the lock member 40 is fixed to the lower jacket 17 via the support shaft 39. Accordingly, when the tooth 51 is at the advance position in the locked state, the movement of the upper jacket 16 relative to the lower jacket 17 in the axial direction X is prevented.

With this, in addition to the frictional force between the lower jacket 17 and the upper jacket 16, the tooth 51 fixed to the side of the lower jacket 17 is engaged with the hole 57 of the lock plate 42 fixed to the upper jacket 16, and it is thereby possible to firmly lock the position of the upper jacket 16 in the axial direction X. Accordingly, the extension and contraction of the steering shaft 3 and the column jacket 4 are stopped and the position of the steering member 8 in the axial direction X is locked, and hence the telescopic adjustment is prevented from being performed.

As shown in FIG. 6, in the case where the steering device 1 is in the locked state and the tooth 51 is at the advance position, a vehicle having the steering device 1 and the vehicle body 2 can perform normal running.

At the time of a vehicle collision, a collision load from the rear side X1 caused by what is called a secondary collision acts on the steering shaft 3 and the column jacket 4. When the vehicle collision has occurred during the normal running of the vehicle, the partition portion 58 adjacent to the rear side X1 of the hole 57 of the lock plate 42 with which the tooth 51 is engaged abuts on the tooth 51 from the rear side X1. Accordingly, the collision load at the time of the secondary collision is transmitted to the tooth 51 via the partition portion 58. With this, the lock portion 47 of the lock member 40 is broken at the low-strength portion 53 that has the lowest strength in the lock portion 47. With this, a part of energy at the time of the secondary collision is absorbed.

In addition, with the brake of the lock portion 47, the tooth 51 engaged with the hole 57 of the lock plate 42 in the lock portion 47 is separated from the portion of the lock portion 47 other than the tooth 51 at the low-strength portion 53. As a result, the upper jacket 16 to which the lock plate 42 is fixed moves relative to the fixed lower jacket 17 such that the column jacket 4 contracts. With this relative movement, it is possible to absorb the energy at the time of the secondary collision during the vehicle collision almost completely.

Thus, with the contraction of the column jacket 4 and the steering shaft 3 and the brake of the lock member 40, it is possible to absorb the energy at the time of the vehicle collision. In addition, by providing the low-strength portion 53 as the breakaway portion in the existing lock member 40, it is not necessary to add a new component having the breakaway portion, and hence it is possible to prevent an increase in the number of component and achieve a reduction in cost.

In the state in which the lock portion 47 is broken at the low-strength portion 53, the end portion of the lock portion 47 on the rear side X1 is positioned on the lower side Z2 of the first stopper 64 of the lock plate 42. Accordingly, at the time of the movement of the upper jacket 16 relative to the lower jacket 17 to the front side X2, the lock portion 47 does not interfere with the first stopper 64.

Figure 7:
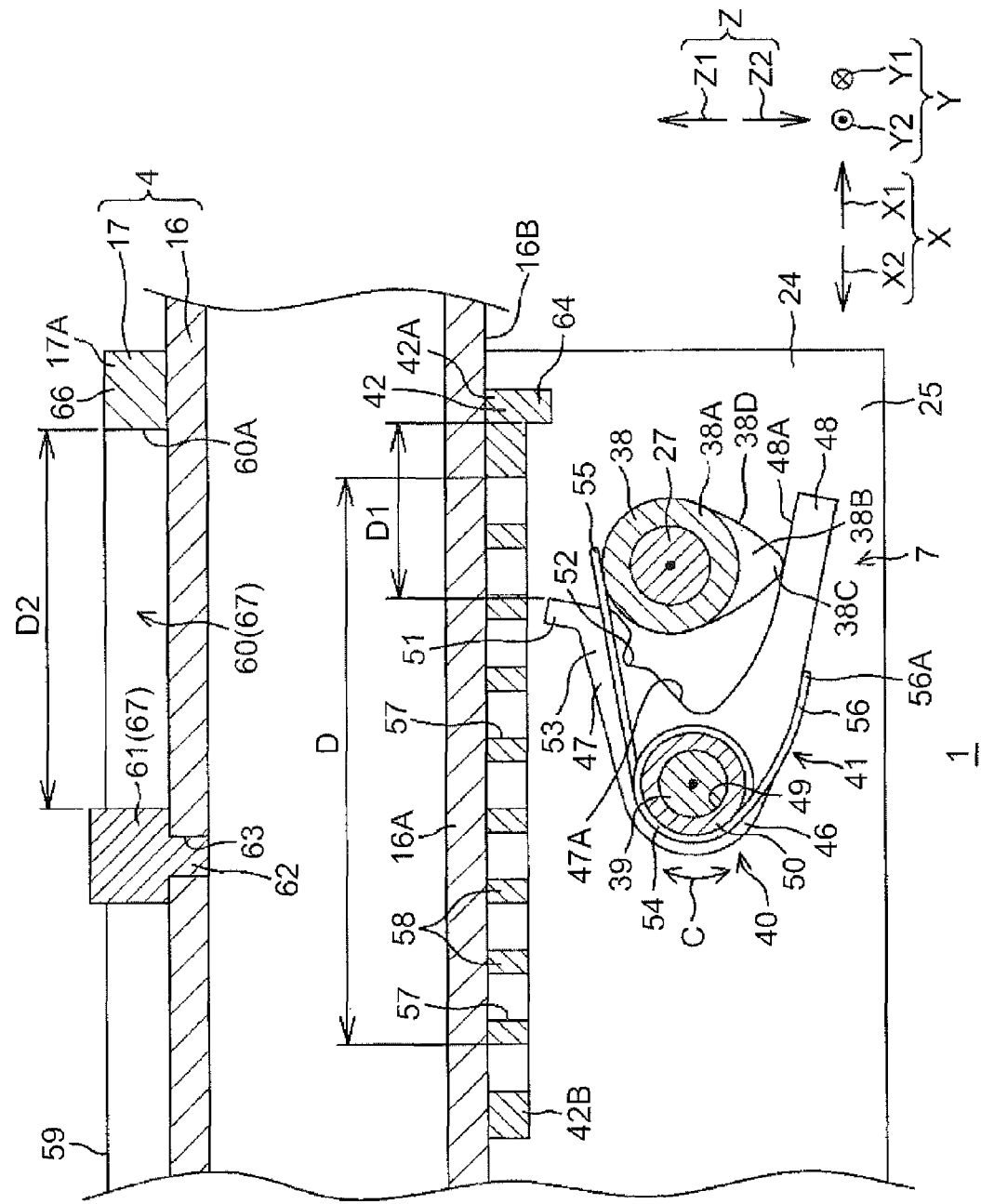
FIG. 7 is a view showing a state in which a tooth 51 retreats from a hole 57 in the steering device 1 shown in FIG. 6.

FIG. 7 is a view showing a state in which the tooth 51 has retreated from the hole 57 in the steering device 1 shown in FIG. 6.

In the state in FIG. 6, the clamping shaft 27 is rotated by operating the operation member 30 such that the steering device 1 is switched from the locked state to the lock-released state. Then the cam 38 rotates integrally with the clamping shaft 27 counterclockwise when viewed from the left side Y2 such that the cam portion 38B that has been directed to the front side X2 is directed to the lower side Z2. With the rotation of the cam 38, the cam portion 38B pushes down the contact portion 48 of the lock member 40 to the lower side Z2.

With this, the entire lock member 40 rotates about the support shaft 39 to the lower side Z2 against the biasing force of the biasing member 41. With this, the tooth 51 of the lock member 40 starts to retreat from the lock plate 42 to the lower side Z2, and be disengaged from the hole 57 of the lock plate 42 with which the tooth 51 has been engaged and.

As shown in FIG. 7, when the steering device 1 is brought into the lock-released state, the cam portion 38B of the cam 38 is directed to the lower side Z2, and the lock member 40 is fully rotated to the lower side Z2. At this point, the tooth 51 of the lock member 40 completely retreats from the lock plate 42 to the lower side Z2, and is completely disengaged from the hole 57 of the lock plate 42 with which the tooth 51 has been engaged. The positions of the lock member 40 and the tooth 51 that have retreated from the lock plate 42 are called "retreat positions". Thus, the lock member 40 and the tooth 51 are pushed down by the cam portion 38B and are thereby moved to the retreat positions against the biasing force of the biasing member 41.

Note that, at the retreat position, the end portion of the tooth 51 on the upper side Z1 is positioned on the upper side Z1 of the end portion of the first stopper 64 of the lock plate 42 on the lower side Z2.

Similarly to the locked state, in the lock-released state as well, the biasing member 41 biases the entire lock member 40 to the upper side Z1. In addition, the cam portion 38B of the cam 38 comes in contact with the contact portion 48 of the lock member 40 from the upper side Z1. Accordingly, the tooth 51 of the lock member 40 is constantly biased toward the advance position (toward the lock plate 42) by the biasing member 41, but the tooth 51 is positioned at the retreat position in the lock-released state. Thus, the entire lock member 40 including the tooth 51 can advance to or retreat from the lock plate 42.

In order to cause the tooth 51 to advance to or retreat from the lock plate 42, it is necessary to change the operation position as the position of the operation member 30 in the circumferential direction of the clamping shaft 27 between the locked state and the lock-released state. Irrespective of the operation position of the operation member 30, the biasing member 41 constantly biases the lock member 40 toward the advance position.

In addition, as described above, the operation member 30 is mechanically separated from the lock member 40. Further, the lock member 40 is linked with the operation of the operation member 30 via the cam 38 only when the lock member 40 moves to the retreat position.

Accordingly, when the lock member 40 and the operation member 30 are combined in the assembly of the steering device 1, it is only necessary to pay attention to the linkage with the operation of the operation member 30 when the lock member 40 moves to the retreat position. As a result, it is possible to omit work for adjusting relative positions of the lock member 40 and the operation member 30 such that the lock member 40 can move to the advance position and the retreat position accurately. As a result, it is possible to reduce difficulty in the assembly of the steering device 1.

In the state in which the tooth 51 is at the retreat position, the prevention of the movement of the lock plate 42 in the axial direction X by the lock member 40 is released. As a result, the upper jacket 16 can freely move relative to the lower jacket 17 in the axial direction X with the lock plate 42, and hence it becomes possible to cause the steering shaft 3 and the column jacket 4 to extend or contract to thereby perform the telescopic adjustment of the steering member 8. When the telescopic adjustment is performed, the individual holes 57 of the lock plate 42 sequentially pass on the upper side Z1 of the tooth 51 at the retreat position along the axial direction X. In addition, in this state, it is also possible to perform the tilt adjustment.

Herein, in the lower jacket 17, in an upper wall 59 positioned on the side opposite to the side of the support portion 25 with the upper jacket 16 interposed therebetween in the up-down direction Z, an elongated hole 60 that has a length L (see FIG. 1) and extends in the axial direction X is formed.

The elongated hole 60 passes through the upper wall 59 of the lower jacket 17 in the up-down direction Z. Both end portions of the elongated hole 60 in the axial direction X are closed, and are not opened to the outside of the lower jacket 17.

Into the elongated hole 60, an engagement portion 61 is loosely inserted so as to be movable in the axial direction X. The engagement portion 61 is a pin in a substantially rectangular solid shape. In the engagement portion 61, an engagement convex portion 62 provided on the surface on the lower side Z2 is fitted by, for example, press-fitting in an engagement concave portion 63 provided on the outer peripheral surface 16B of the upper jacket 16. With this, the engagement portion 61 is fixed to the upper jacket 16. The engagement portion 61 may also be fixed to the upper jacket 16 by welding or screw fastening.

With reference to FIG. 7, in the telescopic adjustment, when the steering member 8 is moved in the axial direction X, the upper jacket 16 moves relative to the lower jacket 17 in the axial direction X. A distance corresponding to the maximum movement amount of the upper jacket 16 in the telescopic adjustment of the steering member 8 is designated by a reference mark "D". The distance D corresponds to a distance between the end surface of the partition portion 58 on the front side X2 adjacent to the rear side X1 of the rearmost hole 57 in the lock plate 42 and the end surface of the partition portion 58 on the front side X2 adjacent to the rear side X1 of the frontmost hole 57 in the lock plate 42.

In the telescopic adjustment, when the steering member 8 is moved to the front side X2, the upper jacket 16 moves relative to the lower jacket 17 to the front side X2. With the relative movement of the upper jacket 16, the first stopper 64 of the lock plate 42 moves to the front side X2.

Herein, as described above, at the retreat position, the end portion of the tooth 51 on the upper side Z1 is positioned on the upper side Z1 of the end portion of the first stopper 64 of the lock plate 42 on the lower side Z2. Accordingly, when the first stopper 64 has moved a distance D1 in the axial direction X between the tooth 51 and the first stopper 64, the first stopper 64 abuts on the tooth 51 of the lock member 40 from the rear side X1. Note that the strength of the low-strength portion 53 is set such that the lock member 40 is not broken by the abutment.

Therefore, the movement of the upper jacket 16 relative to the lower jacket 17 to the front side X2 is restricted by the first stopper 64. In addition, by providing the first stopper 64 in the existing lock plate 42, it is not necessary to add a new component having the first stopper 64, and hence it is possible to prevent an increase in the number of components and achieve a reduction in cost.

Note that, with the movement of the upper jacket 16 relative to the lower jacket 17 to the front side X2, the engagement portion 61 moves to the front side X2 in the elongated hole 60. Herein, the distance L of the elongated hole 60 is longer than the distance D. Accordingly, the engagement portion 61 does not abut on a peripheral edge portion 65 of the end portion of the elongated hole 60 on the front side X2 in the upper wall 59 of the lower jacket 17 before the first stopper 64 of the lock plate 42 abuts on the tooth 51 of the lock member 40.

In the telescopic adjustment, when the steering member 8 is moved to the rear side X1, the upper jacket 16 moves relative to the lower jacket 17 to the rear side X1. With the relative movement of the upper jacket 16, the engagement portion 61 moves to the rear side X1 in the elongated hole 60. The engagement portion 61 moves a distance D2 between the engagement portion 61 and a peripheral edge portion 66 of an end portion 60A of the elongated hole 60 on the rear side X1 in the axial direction X, and abuts on the peripheral edge portion 66.

Thus, the engagement portion 61 and the elongated hole 60 constitute a second stopper 67 that restricts the movement of the upper jacket 16 relative to the lower jacket 17 to the rear side X1.

Accordingly, in the telescopic adjustment, the engagement portion 61 abuts on the peripheral edge portion 66 of the elongated hole 60, hence, the second stopper 67 can prevent the unnecessary movement of the upper jacket 16 relative to the lower jacket 17 to the rear side X1. In addition, in the elongated hole 60, since the both end portions 60A and 60B in the axial direction X are closed, the engagement portion 61 in the elongated hole 60 is not disengaged from the elongated hole 60 toward both sides in the axial direction X so that it is possible to prevent the upper jacket 16 from being detached from the lower jacket 17 unexpectedly.

In the telescopic adjustment, the distance D corresponding to the maximum movement amount of the movement of the upper jacket 16 relative to the lower jacket 17 in the axial direction X is set to be smaller than the sum of the distance D1 and the distance D2.

After the telescopic adjustment or the tilt adjustment of the steering member 8, as shown in FIG. 6, the operation member 30 is operated again, and the steering device 1 is brought into the locked state and the tooth 51 is moved to the locked position. Then the positions of the upper jacket 16 in the axial direction X and the tilt direction are locked. Thus, the tooth 51 can be advance to or retreat from the lock plate 42 in accordance with the operation of the operation member 30, and is engaged with any of the holes 57 in the lock plate 42 in the state in which the tooth 51 advances to the lock plate 42 at the advance position.

In addition, as described above, at the time of the secondary collision, the upper jacket 16 moves relative to the lower jacket 17 to the front side X2. At this point, with the relative movement of the upper jacket 16, the engagement portion 61 moves a distance obtained by subtracting the distance D2 from the length L (see FIG. 1) of the elongated hole 60 in the axial direction X to the front side X2 in the elongated hole 60. Thereafter, the engagement portion 61 moves to the end portion 60B of the elongated hole 60 on the front side X2 in the axial direction X, and abuts on the peripheral edge portion 65 (see FIG. 1).

Note that the engagement portion 61 can move in the axial direction X in the elongated hole 60 after the secondary collision. Accordingly, in the case where the upper jacket 16 is moved relative to the lower jacket 17 to the rear side X1 after the secondary collision, the engagement portion 61 abuts on the peripheral edge portion 66, and hence the engagement portion 61 and the peripheral edge portion 66 function as the second stopper 67 also after the secondary collision.

Thus, the length L of the elongated hole 60 in the axial direction X corresponds to the sum of the distance D that corresponds to the maximum movement amount of the upper jacket 16 in the telescopic adjustment of the steering member 8 and the maximum movement amount of the upper jacket 16 for absorbing the energy at the time of the vehicle collision.

Next, a half-locked state in which the tooth 51 is not engaged with any hole 57 and is brought into pressure contact with any partition portion 58 from the lower side Z2 will be described.

Figure 8:
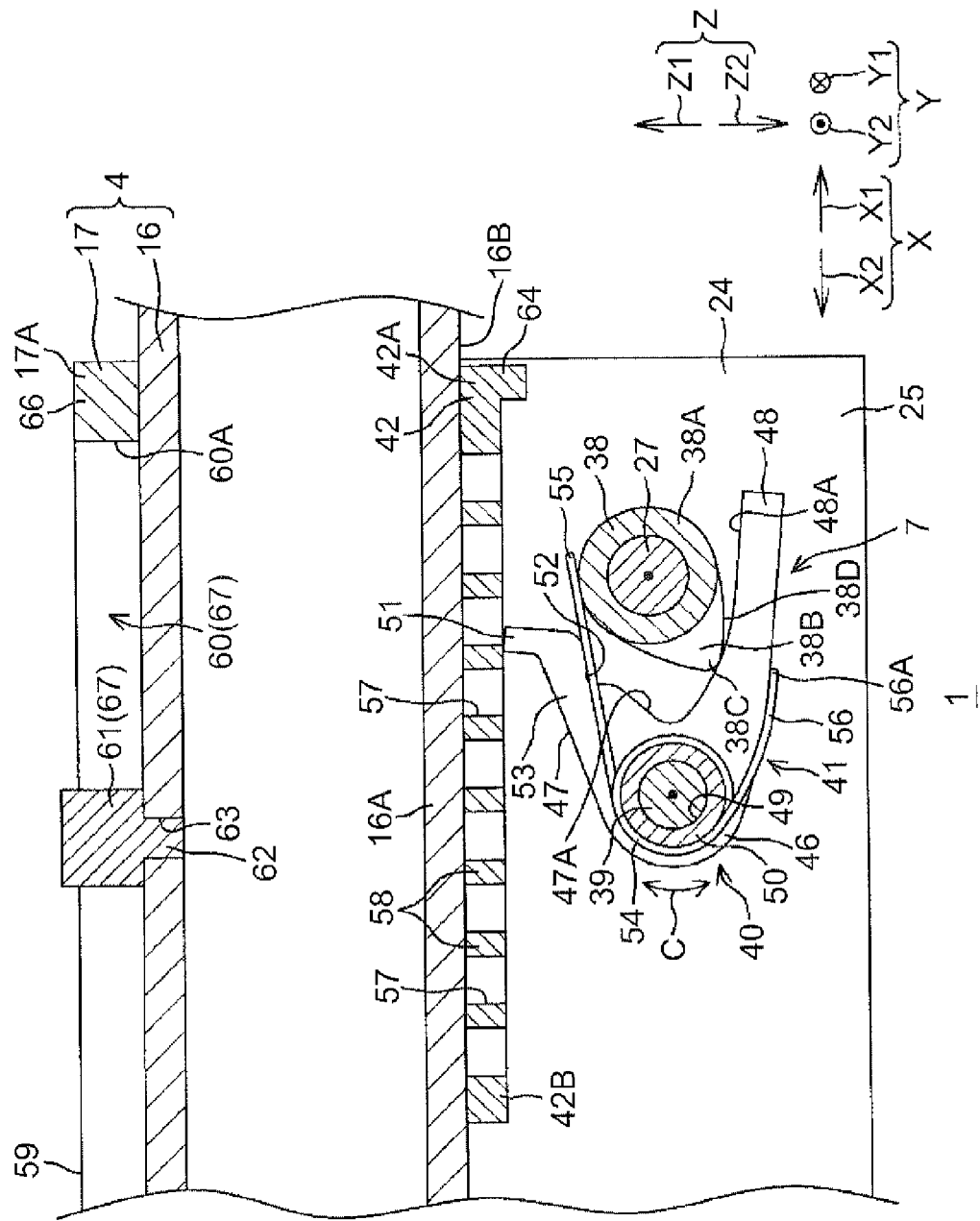
FIG. 8 is a view showing a state in which the tooth 51 is in a half-locked state in the steering device 1 shown in FIG. 6.

FIG. 8 is a view a state in which the tooth 51 is in the half-locked state in the steering device 1 shown in FIG. 6.

When the tooth 51 at the retreat position is caused to move to the advance position by operating the operation member 30 after the telescopic adjustment or the tilt adjustment, in most cases, the tooth 51 is fitted in any hole 57 without hitting against the partition portion 58 of the lock plate 42.

However, as shown in FIG. 8, depending on the position of the tooth 51 in the axial direction X when the operation member 30 is operated, there are cases where the tooth 51 hits against the partition portion 58 from the lower side Z2 and is brought into pressure contact with the partition portion 58 before the tooth 51 reaches the advance position.

When the tooth 51 is in the half-locked state and the vehicle collision occurs, before the lock portion 47 of the lock member 40 is broken at the low-strength portion 53, i.e., before the separation, the lock plate 42 moves to the front side X2 together with the upper jacket 16.

With the movement of the lock plate 42, the position of the hole 57 (referred to as the "next hole 57") adjacent to the rear side X1 of the partition portion 58 with which the tooth 51 has been in pressure contact matches the position of the tooth 51. As described above, the tooth 51 is constantly biased to the upper side Z1 with the biasing force of the biasing member 41. Accordingly, the tooth 51 is fitted in the next hole 57 immediately after the tooth 51 slides on the surface of the partition portion 58 on the lower side Z2 to the rear side X. Thereafter, the lock portion 47 is broken at the low-strength portion 53, and the separation is thereby caused.

Thus, even in the case where the half-locked state occurs, the tooth 51 is fitted in the next hole 57 immediately after the vehicle collision, and it is thereby possible to reliably absorb the energy at the time of the secondary collision.

Next, a first modification of the invention will be described.

Figure 9:
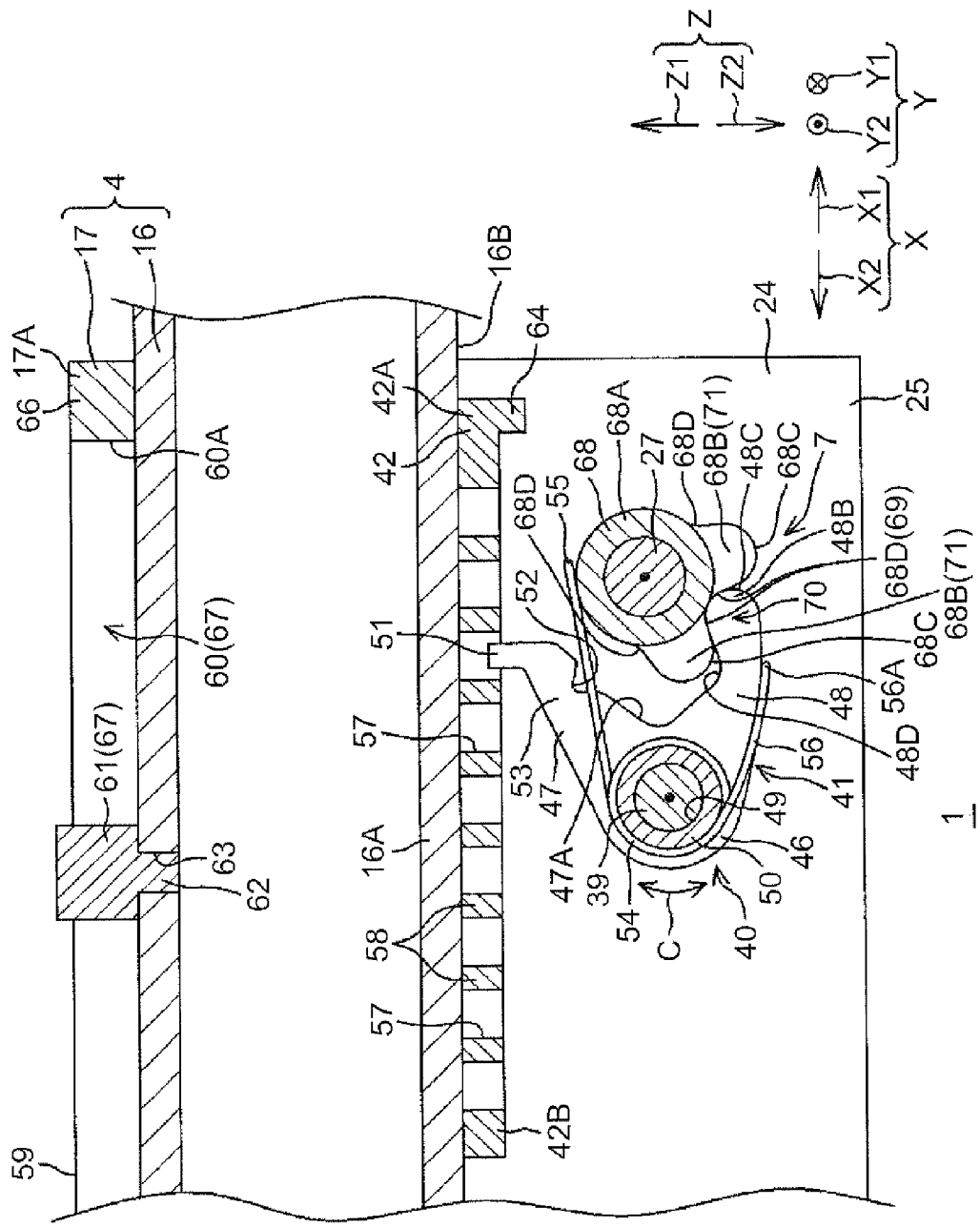
FIG. 9 is a view in which a first modification of the invention is applied to the steering device 1 shown in FIG. 6.

FIG. 9 is a view in which the first modification of the invention is applied to the steering device 1 shown in FIG. 6. In FIG. 9, the same members as those described in the foregoing are designated by the same reference numerals and the description thereof will be omitted (the same applies to FIGS. 10 and 11).

With reference to FIG. 9, in the first modification, a cam 68 is used instead of the cam 38. The cam 68 integrally includes a cylindrical boss portion 68A that extends in the right-left direction Y, and a pair of cam portions 68B that protrude outward in the radial direction of the boss portion 68A. Each cam portion 68B has a substantially arc-shaped outer peripheral surface 68C that expands outward in the radial direction of the boss portion 68A when view from the right-left direction Y, and a pair of concave surfaces 68D positioned at both ends of the outer peripheral surface 68C. Each concave surface 68D has a substantially arc shape that is concavely curved as a boundary between the outer peripheral surface 68C and the outer peripheral surface of the boss portion 68A.

The pair of the cam portions 68B are arranged in the circumferential direction of the boss portion 68A. As shown in FIG. 9, when the lock member 40 is at the advance position, one of the pair of the cam portions 68B protrudes from the boss portion 68A to the lower side Z2, and the other of the pair of the cam portions 68B protrudes from the boss portion 68A to the front side X2. The concave surfaces 68D that are adjacent to each other in the circumferential direction of the boss portion 68A are smoothly connected to each other. Accordingly, when viewed from the right-left direction Y, the concave surfaces 68D constitute a substantially arc-shaped concave surface 69 as a whole. Herein, a valley-shaped space defined between the pair of the cam portions 68B is designated by a reference numeral "70". The space 70 is defined by the concave surface 69 and the portions of the outer peripheral surfaces 68C of the cam portions 68B that are adjacent to the concave surface 69. The space 70 is exposed outward in the radial direction of the boss portion 68A.

Similarly to the above-described cam 31, the cam 68 is disposed in the slit 24 of the lower jacket 17, and the portion of the clamping shaft 27 that is exposed in the slit 24 between the pair of the support portions 25 is inserted into the boss portion 68A. The boss portion 68A and the clamping shaft 27 are fitted to each other by spline fitting or the like. Accordingly, the cam 68 can rotate integrally with the clamping shaft 27 in accordance with the operation of the operation member 30.

An end portion 48B of the contact portion 48 of the lock member 40 of the first modification on the rear side X1 has a substantially arc shape that protrudes to the rear side X1 when viewed from the right-left direction Y. A substantially arc-shaped surface that surrounds the end portion 48B is designated by a reference numeral "48C" when viewed from the right-left direction Y. A surface 48D of the contact portion 48 adjacent to the surface 48C on the front side X2 is depressed to the lower side Z2. The surface 48D is smoothly connected to the surface 48C.

In the state in which the tooth 51 of the lock member 40 is at the advance position, the end portion 48B of the contact portion 48 is disposed in the space 70, and is sandwiched between the pair of the cam portions 68B. In this state, the surface 48C of the end portion 48B of the contact portion 48 is in contact with the concave surface 69 and the outer peripheral surface 68C of each cam portion 68B. In this state, the biasing force from the biasing member 41 is transmitted mainly to the boss portion 68A on the front side X2. In this manner, the end portion 48B of the contact portion 48 is engaged with the pair of the cam portions 68B. In the first modification, when the steering device 1 is assembled, it is possible to easily position the lock member 40 and the cam 68. That is, in the state in which the tooth 51 of the lock member 40 that functions as a positioning portion 71 for positioning the lock member 40 is at the advance position, when the operation member 30 is operated and the cam 68 is rotated counterclockwise along the circumferential direction of the clamping shaft 27, the contact portion 48 is gradually pushed down to the lower side Z2. With this, the tooth 51 is also pushed down to the lower side Z2 and moves to the retreat position. Though not shown in the drawing, in the state in which the tooth 51 is positioned at the retreat position, the concave surface 69 and the surface 48C of the contact portion 48 are not in contact with each other, and the outer peripheral surface 68C of the cam portion 68B on the front side X2 and the surface 48D of the contact portion 48 are in contact with each other. In this state, it is possible to perform the telescopic adjustment of the steering member 8.

In the state in which tooth 51 is at the retreat position, when the operation member 30 is operated again and the cam 68 is rotated clockwise along the circumferential direction of the clamping shaft 27, the contact portion 48 is gradually pushed up to the upper side Z1 with the biasing force of the biasing member 41. With this, the tooth 51 is also pushed up to the upper side Z1 and returns to the advance position finally.

Note that, also in the case of the steering device having a configuration in which the lock mechanism 7 is disposed on the opposite side (i.e., on the side of the upper wall 59) in the up-down direction Z beyond the upper jacket 16, it is possible to use the same cam 68 as that used in the steering device 1 of the first modification.

The shape of each of the pair of the cam portions 68B of the cam 68 is not limited to the shape shown in the first modification, and the shape thereof may also be a substantially triangular shape that protrudes outward in the radial direction. In this case as well, the lock member 40 is sandwiched between the pair of the cam portions 68B, and it is thereby possible to easily position the lock member 40 and the cam 68.

In addition, the number of the cam portions 68B of the cam 68 may be one. In this case, the contact portion 48 is divided into two portions at the end portion 48B such that the cam portion 68B can be sandwiched from both sides in the circumferential direction of the clamping shaft 27 between the end portions 48B of the contact portion 48 of the lock member 40.

Further, there can be a case where the number of the cam portions 68B of the cam 68 is one and the end portion 48B of the contact portion 48 is not divided into two portions. In this case, the surface 48C of the contact portion 48 comes in contact with the concave surface 68D of the cam portion 68B and the cam portion 68B is engaged with the end portion 48B, whereby the cam portion 68B functions as the positioning portion. Therefore, it is possible to position the lock member 40 and the cam 68.

Next, a second modification of the invention will be described.

Figure 10:
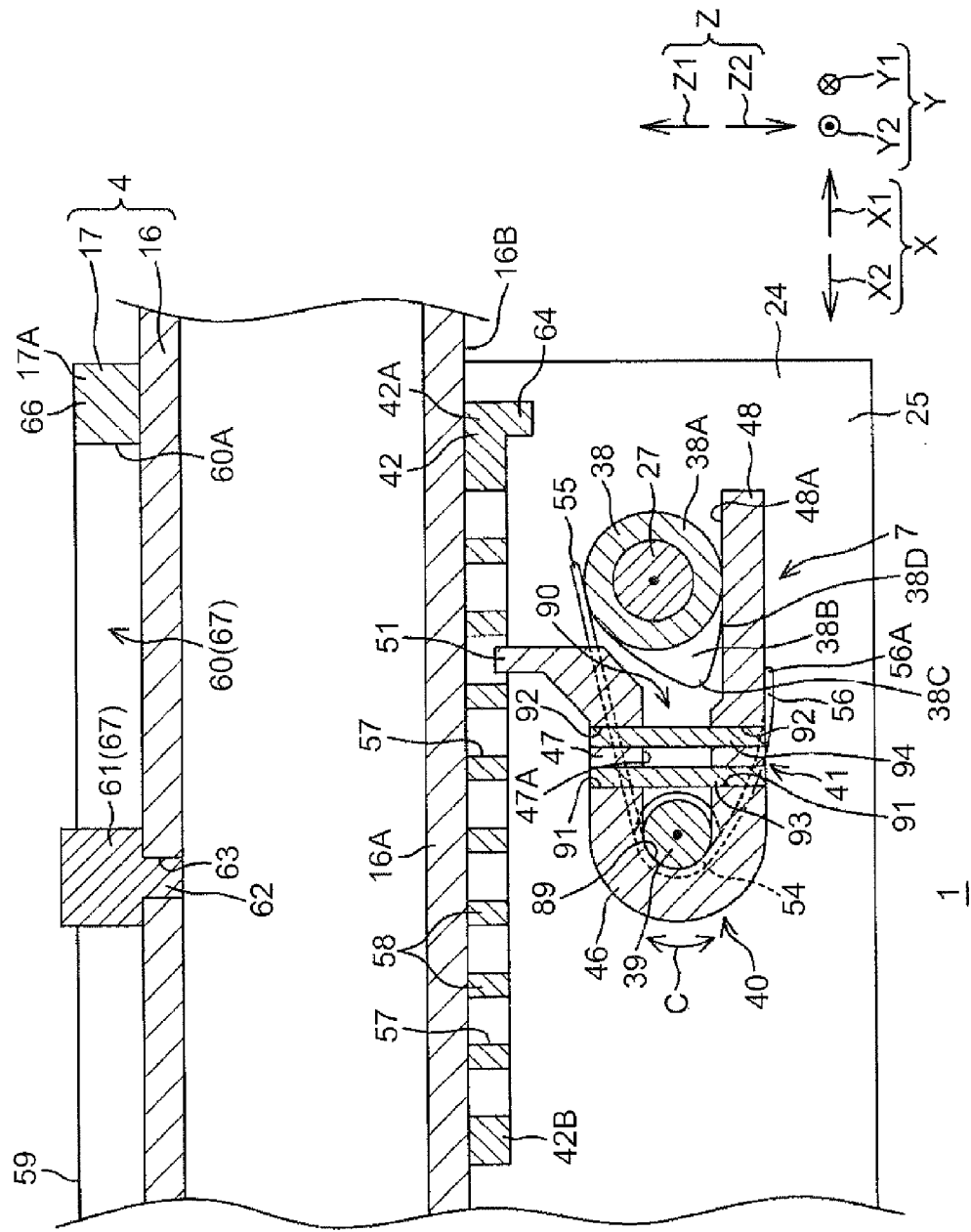
FIG. 10 is a view in which a second modification of the invention is applied to the steering device 1 shown in FIG. 6.

FIG. 10 is a view in which the second modification of the invention is applied to the steering device 1 shown in FIG. 6.

With reference to FIG. 10, the configuration of the lock member 40 of the second modification is substantially the same as that of the lock member 40 of the embodiment described above except the low-strength portion 53. The lock member 40 of the second modification has a substantially U-shape that is inclined clockwise by 90°. The base end portion 46 has a substantially C-shape that is curved so as to expand to the front side X2. An inner peripheral surface of the base end portion 46 is designated by a reference numeral "89". The inner peripheral surface 89 is positioned along the outer peripheral surface of the support shaft 39. The base end portion 46 of the second modification dose not have the insertion hole 49 and the cylindrical portion 50 of the embodiment.

The lock portion 47 of the lock member 40 has a plate shape that extends from the end portion of the base end portion 46 on the upper side Z1 to the rear side X1. The notch 52 is not formed in the lock portion 47 so that the low-strength portion 53 does not exist. The contact portion 48 of the lock member 40 has a plate shape that extends from the end portion of the base end portion 46 on the lower side to the rear side X1.

The inner peripheral surface 89 of the base end portion 46, the lower surface 47A of the lock portion 47, and the upper surface 48A of the contact portion 48 define a groove portion 90 that extends in the axial direction X. The groove portion 90 is opened toward the outside of the lock member 40 to the rear side X1 of the lock member 40. The groove portion 90 has a width in the up-down direction Z that allows passage of the support shaft 39 in the axial direction X.

The lock portion 47 and the contact portion 48 are formed with a first insertion hole 91 and a second insertion hole 92 that extend in the up-down direction Z. The first insertion hole 91 passes through the lock portion 47 and the contact portion 48 in the up-down direction Z. The second insertion hole 92 is positioned on the rear side X1 of the first insertion hole 91 in each of the lock portion 47 and the contact portion 48.

Into the first insertion hole 91 of each of the lock portion 47 and the contact portion 48, a first pin 93 that extends in the up-down direction Z is inserted. Into the second insertion hole 92 of each of the lock portion 47 and the contact portion 48, a second pin 94 that extends in the up-down direction Z is inserted. The first pin 93 and the second pin 94 are provided between the lock portion 47 and the contact portion 48, and are fixed to the lock member 40 in the first insertion hole 91 and the second insertion hole 92.

The support shaft 39 of the second modification is supported so as not to be rotatable relative to the lower jacket 17. The support shaft 39 is disposed at the end portion of the groove portion 90 on the front side X2 so as to be positioned on the front side X2 of the first pin 93. The outer peripheral surface of the support shaft 39 is in contact with the inner peripheral surface 89 of the base end portion 46 of the lock member 40, the lower surface 47A of the lock portion 47, the upper surface 48A of the contact portion 48, and the outer peripheral surface of the first pin 93. The lock member 40 rotates about the support shaft 39 inserted into the groove portion 90 to thereby advance or retreat between the advance position and the retreat position described above.

The coil-shaped portion 54 of the biasing member 41 of the second modification is wound around the support shaft 39.

As described above, in the state in which the tooth of the lock member 40 is at the advance position, the collision load at the time of the vehicle collision (i.e., the collision load that acts on the steering shaft 3 and the column jacket 4 from the rear side X1) is transmitted to the tooth 51 from the lock plate 42. With this, the entire lock member 40 starts to move to the front side X2 with the movement of the lock plate 42. As a result, the first pin 93 fixed to the lock member 40 is broken by the support shaft 39 positioned on the front side X2. With this, the energy at the time of the vehicle collision is absorbed.

When the first pin 93 is broken, the entire lock member 40 further moves to the front side X2. With this, the support shaft 39 abuts on the second pin 94 that is positioned on the rear side X1 of the broken first pin 93. With this, the second pin 94 is broken, and hence the energy at the time of the vehicle collision is further absorbed. After the second pin 94 is broken, the support shaft 39 comes off from the groove portion 90 to the rear side X1, and hence the lock member 40 is no longer supported by the support shaft 39. As a result, the lock member 40 falls to the lower side Z2. With this, the tooth 51 is disengaged from the hole 57 of the lock plate 42, and hence the upper jacket 16 moves to the front side X2.

Thus, in the second modification, the first pin 93 and the second pin 94 function as the breakaway portions, and absorb the energy at the time of the secondary collision. In the second modification, as compared with the configuration in which the low-strength portion 53 is provided in the lock member 40, it is possible to achieve an improvement in the strength of the lock member 40.

Next, a third modification of the invention will be described.

FIG. 11 is a view in which the third modification of the invention is applied to the steering device 1 shown in FIG. 6.

With reference to FIG. 11, the shape of the lock member 40 of the third modification is substantially the same as that of the lock member 40 of the second modification. However, the lock portion 47 and the contact portion 48 of the lock member 40 of the third modification are not formed with the first insertion hole 91 and the second insertion hole 92. Accordingly, the first pin 93 and the second pin 94 are not provided in the lock member 40 of the third modification.

On the lower surface 47A of the lock portion 47 of the lock member 40 of the third modification, a first protrusion 95 is formed. The first protrusion 95 protrudes to the lower side Z2, and has a substantially arc shape when viewed from the right-left direction Y. The first protrusion 95 is adjacent to the rear side X1 of the support shaft 39. In addition, on the upper surface 48A of the contact portion 48 of the lock member 40, a second protrusion 96 is formed. The second protrusion 96 protrudes to the upper side Z1, and has a substantially arc shape when viewed from the right-left direction Y. The second protrusion 96 is formed at the same position as that of the first protrusion 95 in the axial direction X.

The support shaft 39 is supported so as not to be rotatable relative to the lower jacket 17. The support shaft 39 is inserted into the groove portion 90 and disposed at the end portion of the groove portion 90 on the front side X2. The outer peripheral surface of the support shaft 39 is in contact with the inner peripheral surface 89 of the base end portion 46 of the lock member 40, the lower surface 47A of the lock portion 47, the upper surface 48A of the contact portion 48, the first protrusion 95, and the second protrusion 96. The lock member 40 rotates about the support shaft 39 in the circumferential direction C of the support shaft 39.

The coil-shaped portion 54 of the biasing member 41 is wound around the support shaft 39.

As described above, in the state in which the tooth 51 of the lock member 40 is at the advance position, the collision load at the time of the vehicle collision (i.e., the collision load that acts on the steering shaft 3 and the column jacket 4 from the rear side X1) is transmitted to the tooth 51 from the lock plate 42. With this, the entire lock member 40 starts to move to the front side X2 with the movement of the lock plate 42. As a result, the support shaft 39 gets over the first protrusion 95 and the second protrusion 96 so as to widen the groove portion 90 in the up-down direction Z. With this, the energy at the time of the secondary collision is absorbed. Subsequently, when the support shaft 39 comes off from the groove portion 90 of the lock member 40 to the rear side X1, the lock member 40 is no longer supported by the support shaft 39. As a result, the lock member 40 falls to the lower side Z2. Thus, in the third modification, since it is not necessary to provide the low-strength portion 53 in the lock member 40, it is possible to achieve an improvement in the strength of the lock member 40. Further, in the third modification, since it is not necessary to provide a new member for absorbing the energy at the time of the vehicle collision, it is also possible to achieve a reduction in cost.

The invention is not limited to the embodiments described above, and various changes can be made within the scope of the claims.

For example, unlike the embodiment, the elongated hole 60 may be provided in the upper jacket 16, and the engagement portion 61 may be provided in the lower jacket 17. In this case, with the movement of the upper jacket 16 relative to the lower jacket 17 to the rear side X1, the elongated hole 60 moves relative to the engagement portion 61 to the rear side X1. The end portion of the elongated hole 60 on the front side X2 abuts on the engagement portion 61, and the second stopper 67 can thereby prevent the unnecessary movement of the upper jacket 16 relative to the lower jacket 17 to the rear side X1. With this, it is possible to prevent the upper jacket 16 from being detached from the lower jacket 17 unexpectedly.

It is only necessary to provide the elongated hole 60 in one of the lower jacket 17 and the upper jacket 16, and provide the engagement portion 61 in the other of the lower jacket 17 and the upper jacket 16.

In addition, the positional relationship between the support shaft 39 and the clamping shaft 27 in the axial direction X may be opposite to the positional relationship therebetween in the embodiment. That is, the support shaft 39 may be disposed on the rear side X1 of the clamping shaft 27. In this case, the lock member 40 is assembled to the support shaft 39 such that the lock portion 47 and the contact portion 48 are disposed on the front side X2 of the base end portion 46.

What is claimed is:

1. A steering device comprising:
    a steering shaft including a first end to which a steering member is mounted and a second end, wherein the steering shaft is telescopically adjustable in an axial direction of the steering shaft;
    a column jacket rotatably supporting the steering shaft and including an upper jacket positioned on a first end side and a lower jacket positioned on a second end side, wherein the column jacket is telescopically adjustable together with the steering shaft with movement of the upper jacket relative to the lower jacket in the axial direction;
    a lock plate fixed to the upper jacket and provided with a plurality of holes arranged in the axial direction;
    a support bracket fixed to a vehicle body and supporting the column jacket;
    a lock member that advances to and retreats from the lock plate between an advance position at which the lock member is engaged with one of the holes of the lock plate and a retreat position at which the lock member is disengaged from the hole of the lock plate;
    an operation member supported by the support bracket in a state in which the operation member is mechanically separated from the lock member, wherein the operation member is operated when the steering shaft and the column jacket are telescopically adjusted;
    a biasing member that constantly biases the lock member toward the advance position irrespective of operation of the operation member; and
    a transmission member that moves the lock member to the retreat position against a biasing force of the biasing member in accordance with the operation of the operation member.

2. The steering device according to claim 1, further comprising
    a positioning portion that is provided in the transmission member and positions the lock member.

3. The steering device according to claim 1, wherein
    the biasing member biases the lock member and the transmission member such that the lock member and the transmission member approach each other.

4. The steering device according to claim 1, wherein:
    the lock member includes a breakaway portion; and
    the breakaway portion is broken in the lock member at the advance position when a load acts on the steering shaft and the column jacket.

5. The steering device according to claim 4, wherein
    the breakaway portion is a low-strength portion including a notch provided in the lock member.

6. The steering device according to claim 4, further comprising
    a support shaft supported by the lower jacket, wherein:
    the breakaway portion is a pin fixed to the lock member;
    a groove portion is defined in the lock member;
    the support shaft is disposed in the groove portion on a front side of the pin; and
    the pin is broken by the support shaft in the lock member at the advance position when the load acts from a rear side.

7. The steering device according to claim 1, further comprising
    a support shaft supported by the lower jacket, wherein:
    a groove portion is defined in the lock member;
    the support shaft is disposed in the groove portion; and
    a protrusion adjacent to the support shaft is provided in the lock member.

8. The steering device according to claim 1, further comprising
    a first stopper that is provided at an end portion of the lock plate on the first end side and restricts movement of the upper jacket relative to the lower jacket to the second end side by abutment of the first stopper on the lock member from the first end side when the steering shaft and the column jacket are telescopically adjusted.

9. The steering device according to claim 1, further comprising
    a second stopper including an elongated hole that is provided in one of the lower jacket and the upper jacket and includes both end portions closed in the axial direction, and an engagement portion that is fixed to the other of the lower jacket and the upper jacket and is inserted into the elongated hole so as to be movable in the axial direction, wherein:
    the lower jacket has a tubular shape in which the upper jacket is accomodatable; and
    the second stopper restricts movement of the upper jacket relative to the lower jacket to the first end side by abutment of the engagement portion on a peripheral edge portion of an end portion of the elongated hole in the axial direction when the steering shaft and the column jacket are telescopically adjusted.

10. The steering device according to claim 1, wherein
    the operation member is supported by the lower jacket via a first support member; and
    the lock member is supported by the lower jacket via a second support member that is a member other than the first support member.

* * * * *